(12) United States Patent
Hensley et al.

(10) Patent No.: US 8,241,450 B2
(45) Date of Patent: Aug. 14, 2012

(54) METHOD FOR INFLATING A FLUID-FILLED CHAMBER

(75) Inventors: Shaun J. Hensley, Portland, OR (US); Stuart C. Forstrom, Beaverton, OR (US); William A. Brunais, Hillsboro, OR (US)

(73) Assignee: Nike, Inc., Beaverton, OR (US)

( * ) Notice: Subject to any disclaimer, the term of this patent is extended or adjusted under 35 U.S.C. 154(b) by 608 days.

(21) Appl. No.: 11/957,633

(22) Filed: Dec. 17, 2007

(65) Prior Publication Data

US 2009/0151195 A1 Jun. 18, 2009

(51) Int. Cl.
- *A63B 39/00* (2006.01)
- *A63B 41/00* (2006.01)
- *B29C 65/00* (2006.01)
- *B32B 37/00* (2006.01)
- *B32B 38/04* (2006.01)

(52) U.S. Cl. ........ 156/145; 156/146; 156/147; 156/253; 156/261; 156/292; 156/275.1; 156/252

(58) Field of Classification Search .......... 156/145–147, 156/253, 261, 292, 275.1, 252
See application file for complete search history.

(56) References Cited

U.S. PATENT DOCUMENTS

| | | | |
|---|---|---|---|
| 2,575,764 A * | 11/1951 | Morner | 428/72 |
| 2,591,935 A * | 4/1952 | Heigl | 156/386 |
| 2,677,906 A | 5/1954 | Reed | |
| 2,703,770 A | 3/1955 | Melzer | |
| 3,030,640 A | 4/1962 | Gosman | |
| 3,140,039 A * | 7/1964 | Conti | 383/9 |
| 3,608,215 A | 9/1971 | Fukuoka | |
| 3,685,176 A | 8/1972 | Rudy | |
| 3,758,964 A | 9/1973 | Nishimura | |
| 4,049,854 A * | 9/1977 | Casey et al. | 428/72 |
| 4,183,156 A | 1/1980 | Rudy | |
| 4,187,620 A | 2/1980 | Selner | |
| 4,217,705 A | 8/1980 | Donzis | |
| 4,358,902 A | 11/1982 | Cole et al. | |
| 4,506,460 A | 3/1985 | Rudy | |
| 4,547,919 A | 10/1985 | Wang | |
| 4,592,718 A | 6/1986 | Teraoka | |
| 4,670,995 A | 6/1987 | Huang | |
| 4,698,864 A | 10/1987 | Graebe | |
| 4,722,131 A | 2/1988 | Huang | |
| 4,782,602 A | 11/1988 | Lakic | |
| 4,803,029 A | 2/1989 | Iversen et al. | |
| 4,817,304 A | 4/1989 | Parker et al. | |

(Continued)

OTHER PUBLICATIONS

International Search Report and Written Opinion in PCT Application No. PCT/US2008/079078, mailed Mar. 25, 2009.

*Primary Examiner* — Christopher Schatz
*Assistant Examiner* — Matthew Hoover
(74) *Attorney, Agent, or Firm* — Plumsea Law Group, LLC

(57) ABSTRACT

A method of manufacturing a fluid-filled chamber may include utilizing one of a blowmolding and a thermoforming process to define a first surface, a second surface, and a sidewall surface of the chamber. An aperture is defined through the first surface in a location where the first surface is spaced from the second surface. A pressurization apparatus is located adjacent to the first surface and around the aperture, and the pressurization apparatus is utilized to inject a fluid into the chamber through the aperture, compress the first surface against the second surface, and form a bond around the aperture and between the first surface and the second surface.

14 Claims, 31 Drawing Sheets

U.S. PATENT DOCUMENTS

| | | | |
|---|---|---|---|
| 4,823,482 A | 4/1989 | Lakic | |
| 4,845,861 A | 7/1989 | Moumdjian | |
| 4,874,640 A | 10/1989 | Donzis | |
| 4,891,855 A | 1/1990 | Cheng-Chung | |
| 4,906,502 A | 3/1990 | Rudy | |
| 4,912,861 A | 4/1990 | Huang | |
| 4,991,317 A | 2/1991 | Lakic | |
| 4,999,072 A * | 3/1991 | Dischler | 156/145 |
| 4,999,931 A | 3/1991 | Vermeulen | |
| 5,022,109 A | 6/1991 | Pekar | |
| 5,025,575 A | 6/1991 | Lakic | |
| 5,042,176 A | 8/1991 | Rudy | |
| 5,044,030 A | 9/1991 | Balaton | |
| 5,158,767 A | 10/1992 | Cohen et al. | |
| 5,179,792 A | 1/1993 | Brantingham | |
| 5,193,246 A | 3/1993 | Huang | |
| 5,199,191 A | 4/1993 | Moumdjian | |
| 5,224,277 A | 7/1993 | Sang Do | |
| 5,224,278 A | 7/1993 | Jeon | |
| 5,228,156 A | 7/1993 | Wang | |
| 5,235,715 A | 8/1993 | Donzis | |
| 5,245,766 A | 9/1993 | Warren | |
| 5,253,435 A | 10/1993 | Auger et al. | |
| 5,257,470 A | 11/1993 | Auger et al. | |
| 5,335,382 A | 8/1994 | Huang | |
| 5,337,492 A | 8/1994 | Anderie et al. | |
| 5,353,459 A | 10/1994 | Potter et al. | |
| 5,367,791 A | 11/1994 | Gross et al. | |
| 5,406,719 A | 4/1995 | Potter | |
| 5,493,792 A | 2/1996 | Bates et al. | |
| 5,572,804 A | 11/1996 | Skaja et al. | |
| 5,592,706 A | 1/1997 | Pearce | |
| 5,595,004 A | 1/1997 | Lyden et al. | |
| 5,669,161 A | 9/1997 | Huang | |
| 5,686,167 A | 11/1997 | Rudy | |
| 5,704,137 A * | 1/1998 | Dean et al. | 36/28 |
| 5,741,568 A | 4/1998 | Rudy | |
| 5,771,606 A | 6/1998 | Litchfield et al. | |
| 5,832,630 A | 11/1998 | Potter | |
| 5,846,063 A | 12/1998 | Lakic | |
| 5,907,911 A | 6/1999 | Huang | |
| 5,916,664 A | 6/1999 | Rudy | |
| 5,925,306 A | 7/1999 | Huang | |
| 5,952,065 A | 9/1999 | Mitchell et al. | |
| 5,976,451 A | 11/1999 | Skaja et al. | |
| 5,979,078 A | 11/1999 | McLaughlin | |
| 5,993,585 A | 11/1999 | Goodwin et al. | |
| 6,009,637 A | 1/2000 | Pavone | |
| 6,013,340 A | 1/2000 | Bonk et al. | |
| 6,027,683 A | 2/2000 | Huang | |
| 6,029,962 A | 2/2000 | Shorten et al. | |
| 6,065,150 A | 5/2000 | Huang | |
| 6,098,313 A | 8/2000 | Skaja | |
| 6,119,371 A | 9/2000 | Goodwin | |
| 6,127,010 A | 10/2000 | Rudy | |
| 6,128,837 A | 10/2000 | Huang | |
| 6,192,606 B1 | 2/2001 | Pavone | |
| 6,253,466 B1 | 7/2001 | Harmon-Weiss et al. | |
| 6,258,421 B1 | 7/2001 | Potter | |
| 6,374,514 B1 | 4/2002 | Swigart | |
| 6,385,864 B1 | 5/2002 | Sell, Jr. et al. | |
| 6,402,879 B1 | 6/2002 | Tawney et al. | |
| 6,430,843 B1 | 8/2002 | Potter et al. | |
| 6,457,262 B1 | 10/2002 | Swigart | |
| 6,463,612 B1 | 10/2002 | Potter | |
| 6,550,085 B2 | 4/2003 | Roux | |
| 6,571,490 B2 | 6/2003 | Tawney et al. | |
| 6,665,958 B2 | 12/2003 | Goodwin | |
| 6,783,184 B2 | 8/2004 | DiBattista et al. | |
| 6,796,056 B2 | 9/2004 | Swigart | |
| 6,837,951 B2 | 1/2005 | Rapaport | |
| 6,892,477 B2 | 5/2005 | Potter et al. | |
| 6,918,198 B2 * | 7/2005 | Chi | 36/29 |
| 6,931,764 B2 | 8/2005 | Swigart et al. | |
| 6,971,193 B1 | 12/2005 | Potter et al. | |
| 7,000,335 B2 | 2/2006 | Swigart et al. | |
| 7,051,456 B2 | 5/2006 | Swigart et al. | |
| 7,070,845 B2 | 7/2006 | Thomas et al. | |
| 7,076,891 B2 | 7/2006 | Goodwin | |
| 7,086,179 B2 | 8/2006 | Dojan et al. | |
| 7,128,796 B2 | 10/2006 | Hensley et al. | |
| 7,131,218 B2 | 11/2006 | Schindler | |
| 7,141,131 B2 | 11/2006 | Foxen et al. | |
| 7,200,957 B2 | 4/2007 | Hubbard et al. | |
| 7,244,483 B2 | 7/2007 | Tawney et al. | |
| 2003/0183324 A1 * | 10/2003 | Tawney et al. | 156/145 |
| 2007/0006488 A1 | 1/2007 | Litchfield | |

* cited by examiner

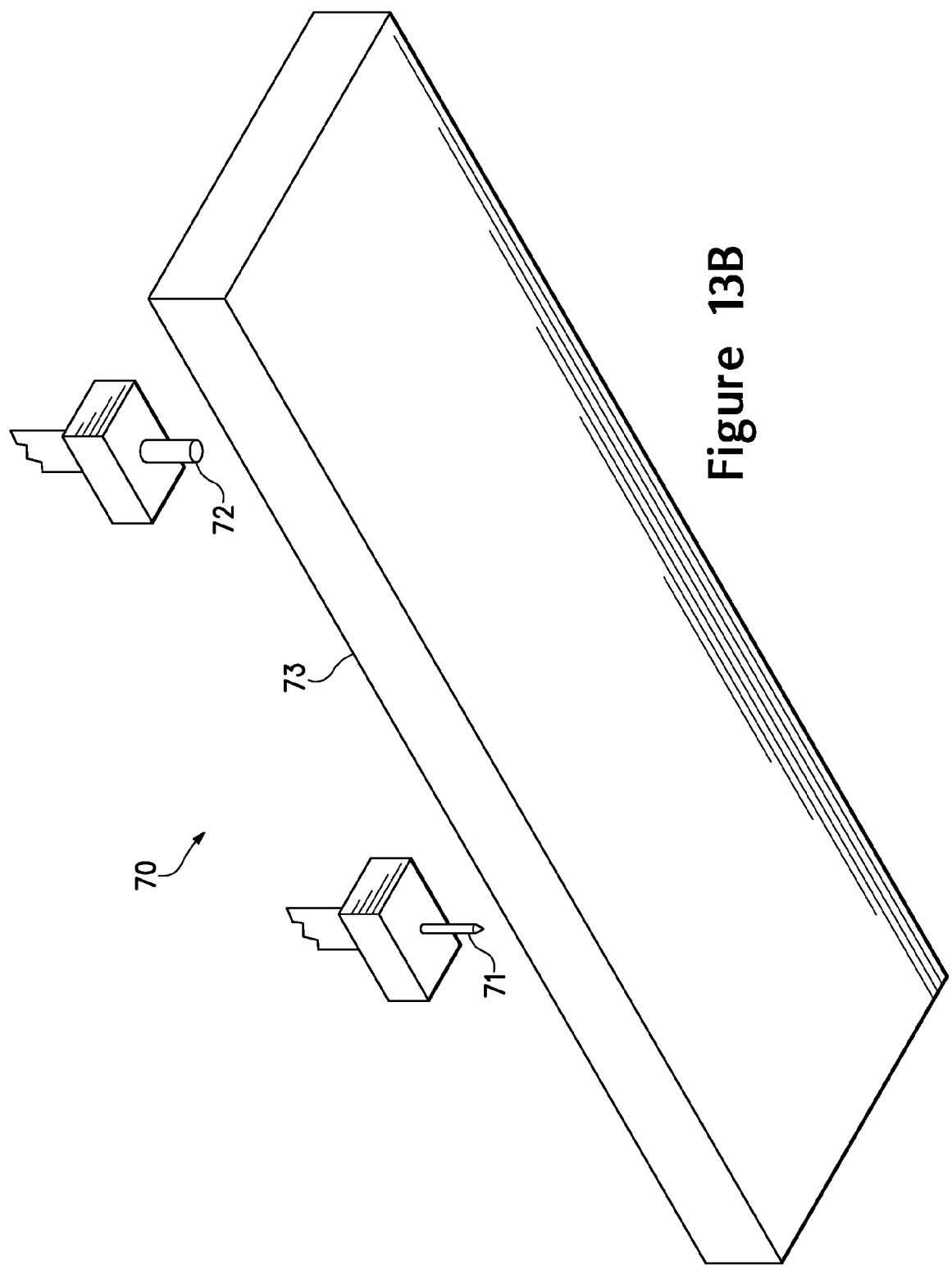

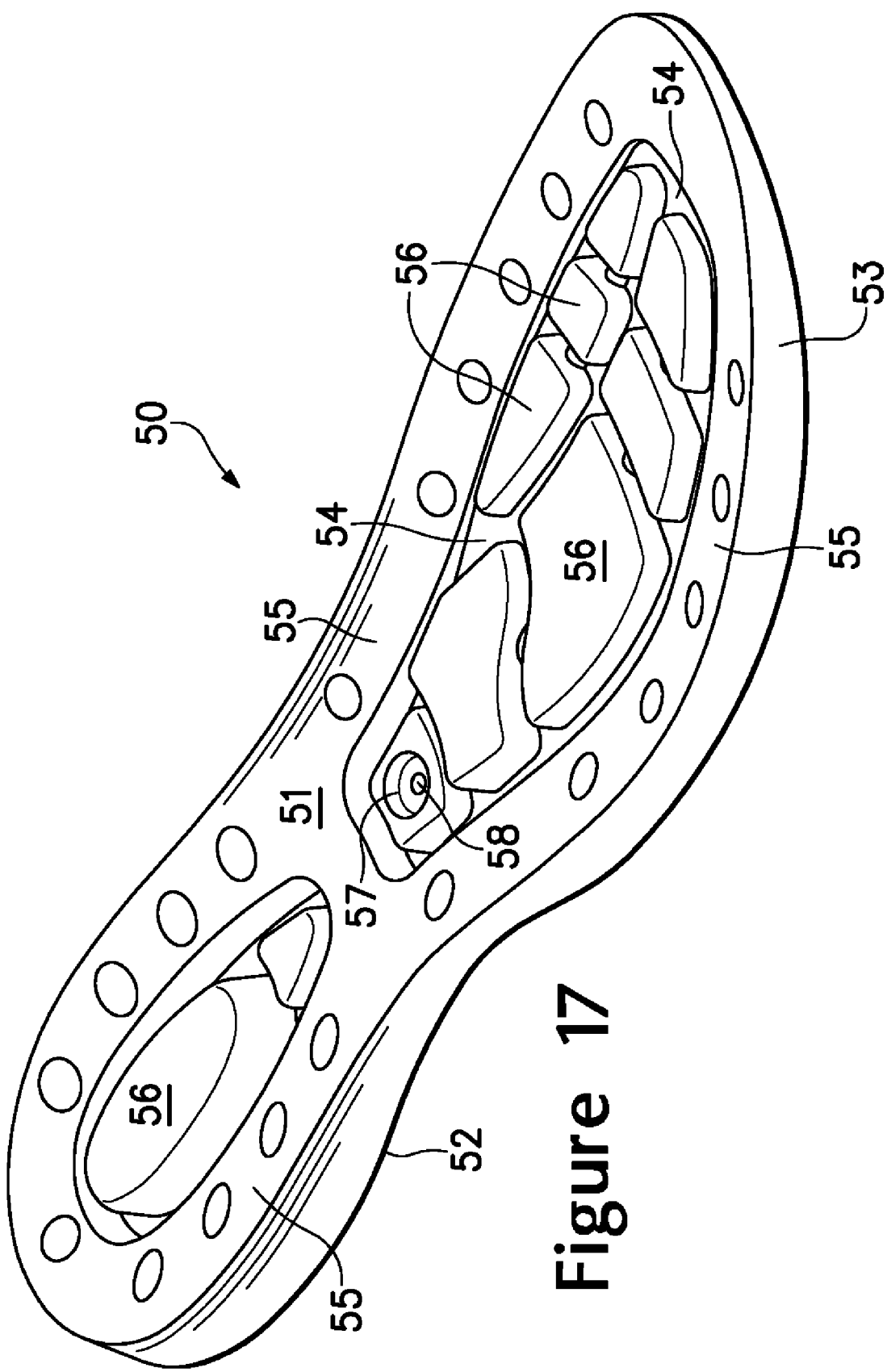

METHOD FOR INFLATING A FLUID-FILLED CHAMBER

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many conventional midsoles are primarily formed from a foamed polymer material, fluid-filled chambers or other non-foam structures may form a majority of some midsole configurations.

Various techniques may be utilized to form fluid-filled chambers for articles of footwear or other products, including a two-film technique, a thermoforming technique, and a blowmolding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blow-molding technique, a parison formed from a molten or otherwise softened polymer material is placed within a mold having a cavity with the desired configuration of the chamber. Pressurized air induces the polymer material to conform with surfaces of the chamber. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

SUMMARY

An article of footwear is disclosed below as having an upper and a sole structure secured to the upper. The sole structure includes a fluid-filled chamber with an upper surface, an opposite lower surface, and a sidewall surface extending between the upper surface and the lower surface. The chamber has an inflation area that defines an aperture extending through one of the upper surface and the lower surface. The upper surface and the lower surface are bonded to each other in the inflation area and around the aperture.

A method of manufacturing a fluid-filled chamber is also disclosed below. The method includes defining a first surface, a second surface, and a sidewall surface of the chamber. An aperture is defined through the first surface in a location where the first surface is spaced from the second surface. A pressurization apparatus is located adjacent to the first surface and around the aperture, and the pressurization apparatus is utilized to inject a fluid into the chamber through the aperture. The first surface is then compressed against the second surface, and a bond is formed around the aperture and between the first surface and the second surface.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 13A and 13B are schematic perspective views of an inflation apparatus.

FIG. 17 is a perspective view of a chamber formed from the mold configuration depicted in FIG. 16.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
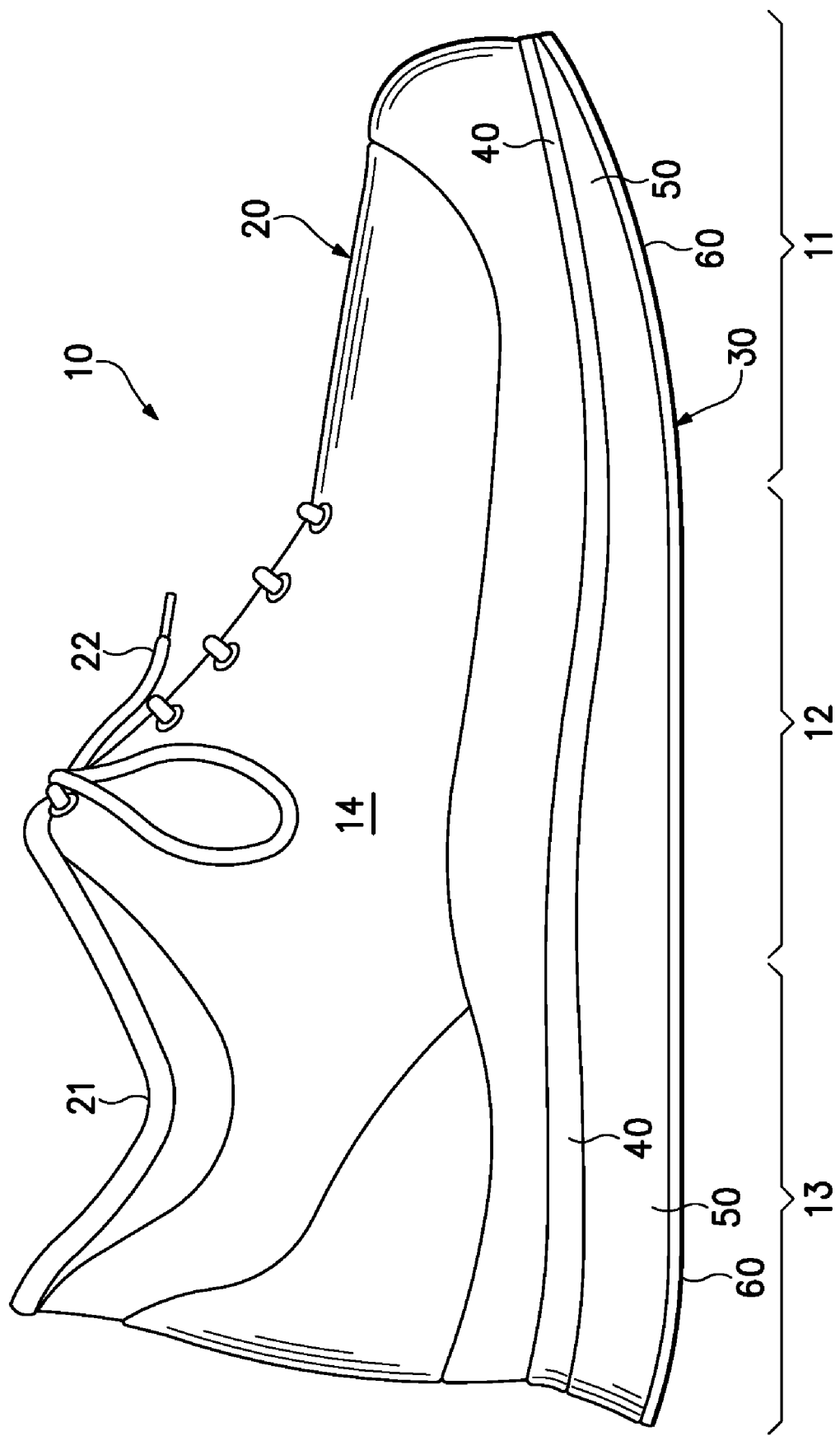
FIG. 1 is a lateral side elevational view of an article of footwear.
Figure 2:
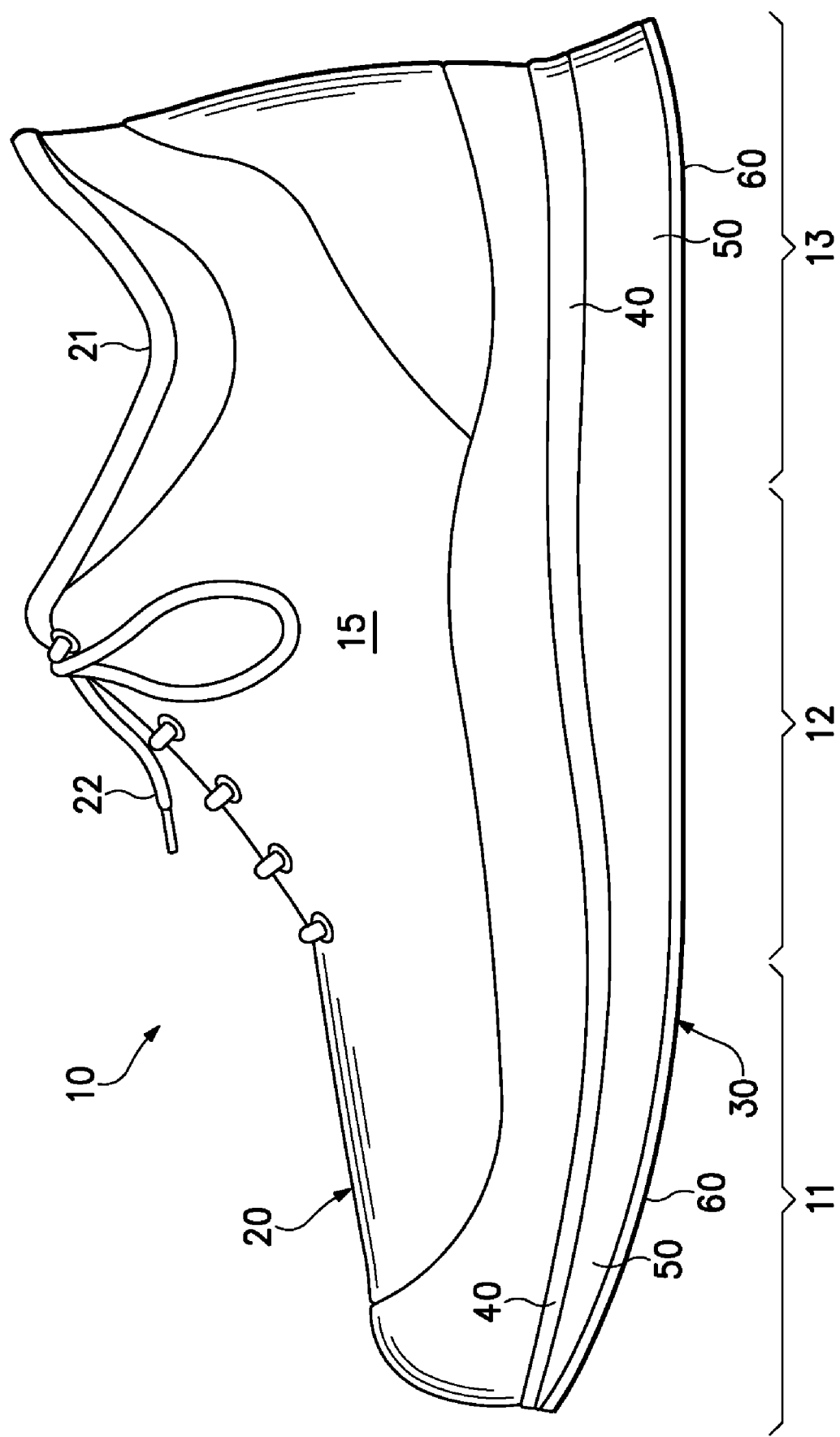
FIG. 2 is a medial side elevational view of the article of footwear.

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textile, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Figure 3:
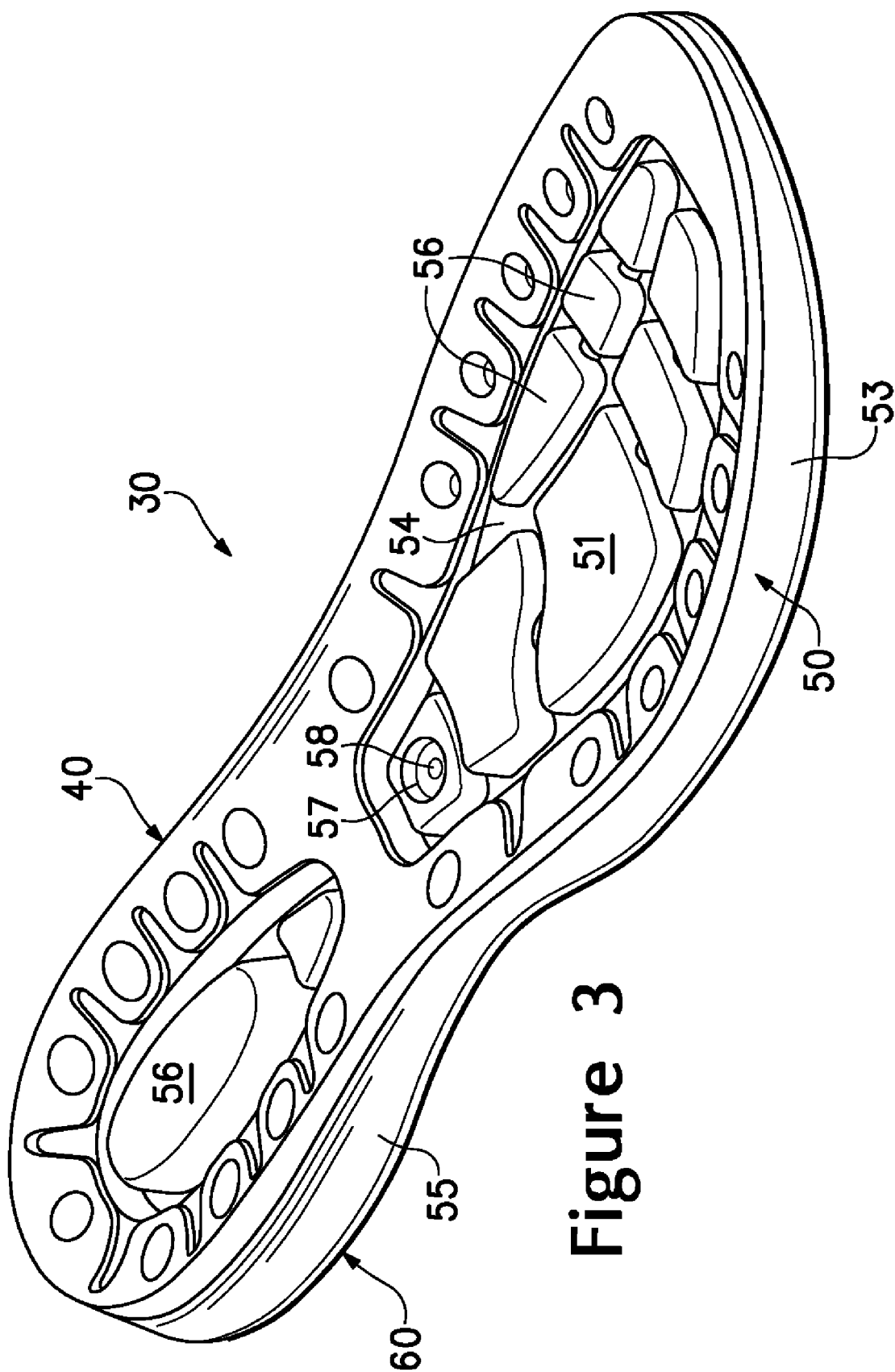
FIG. 3 is a perspective view of a sole structure of the footwear.
Figure 4:
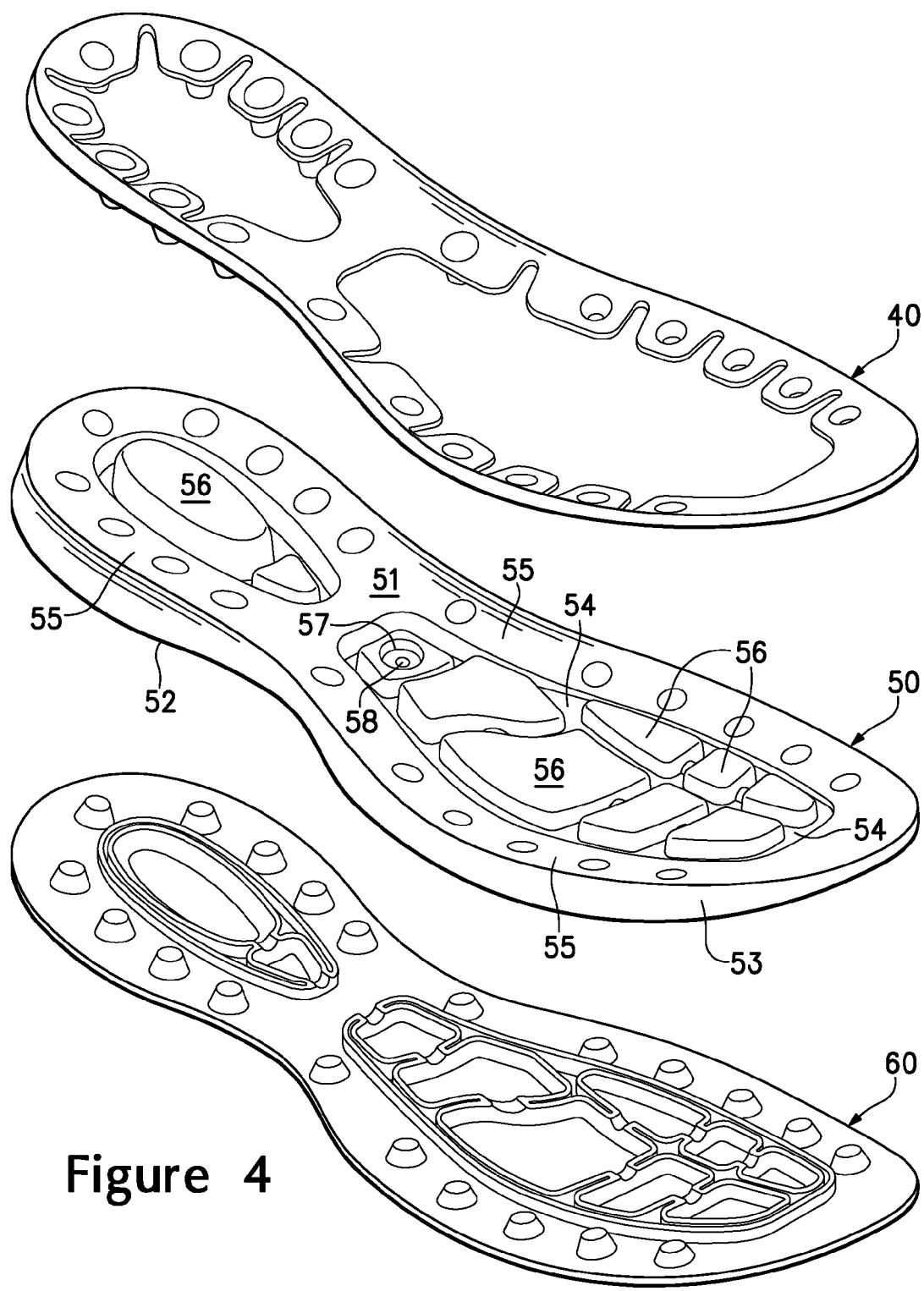
FIG. 4 is an exploded perspective view of the sole structure.
Figure 5:
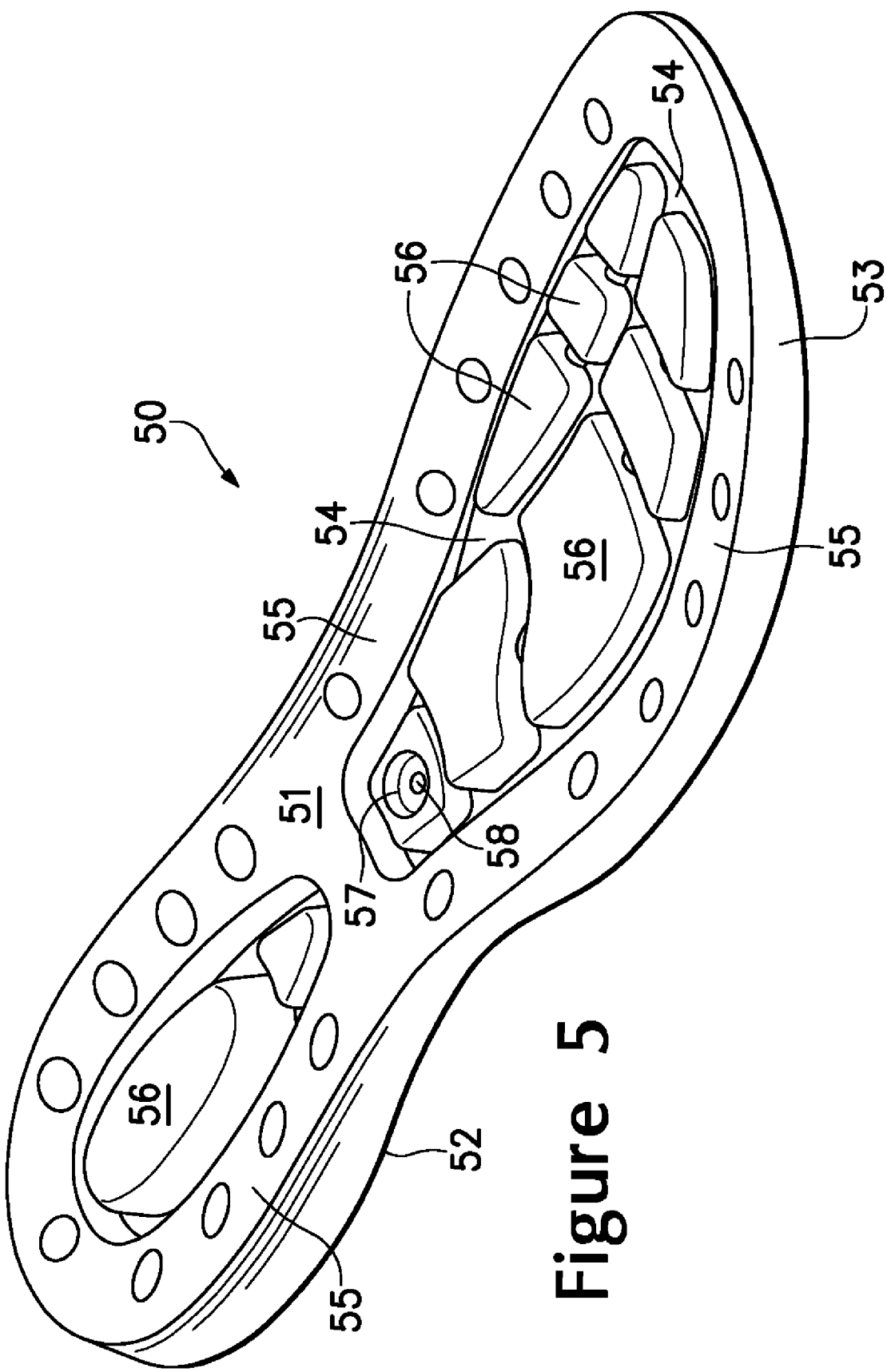
FIG. 5 is a perspective view of a fluid-filled chamber of the sole structure.
Figure 6:
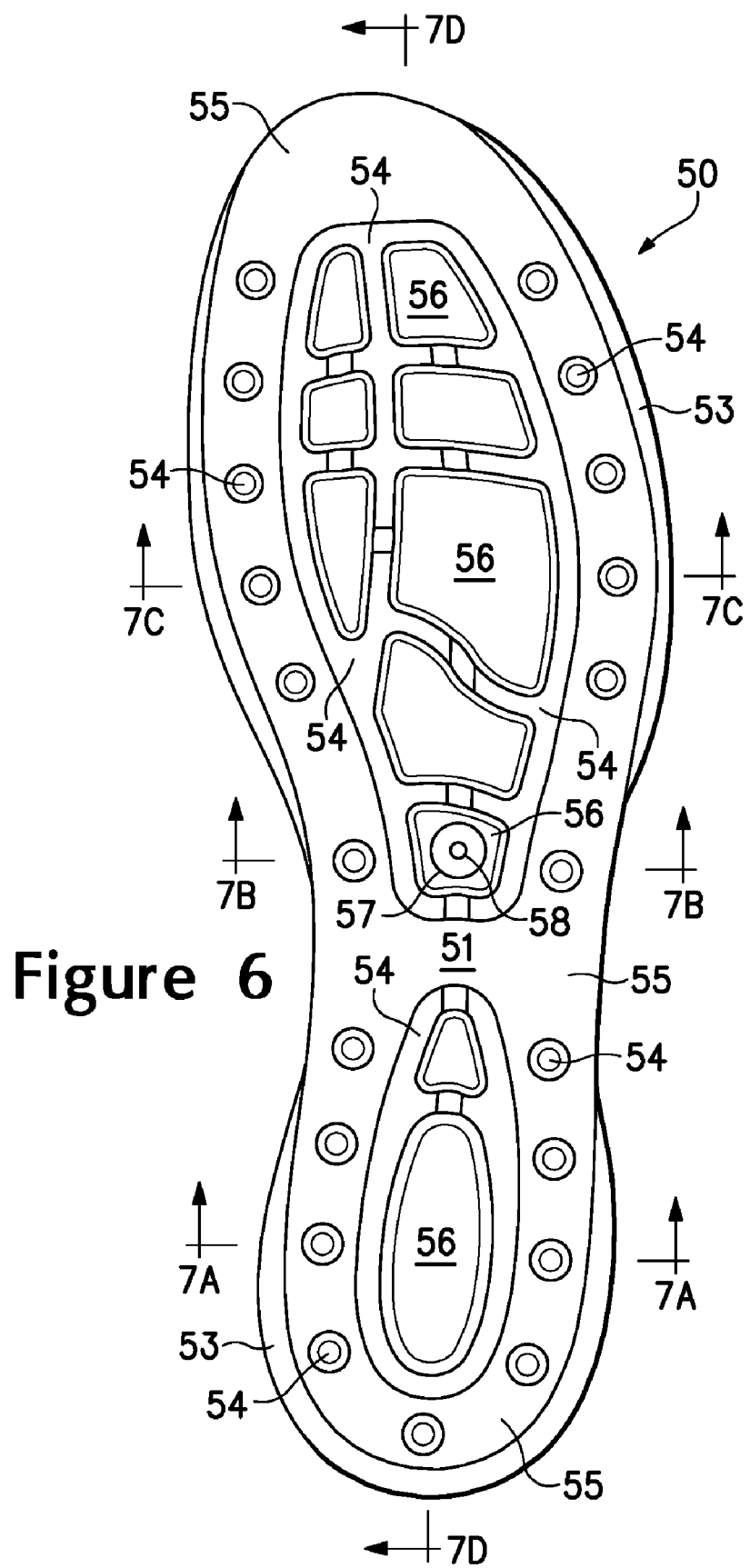
FIG. 6 is a top plan view of the chamber.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a plate 40, a chamber 50, and an outsole 60, as depicted in FIGS. 3 and 4. Plate 40 forms an upper portion of sole structure 30 and is positioned adjacent to upper 20. Chamber 50 forms a middle portion of sole structure 30 and is positioned between plate 40 and outsole 60. In addition, outsole 60 forms a lower portion of sole structure 30 and is positioned to engage the ground. Each of plate 40, chamber 50, and outsole 60 extend around a perimeter of sole structure 30 and have a shape that generally corresponds with an outline of the foot. More particularly, plate 40, chamber 50, and outsole 60 extend from forefoot region 11 to heel region 13 and also from lateral side 14 to medial side 15. Accordingly, each of plate 40, chamber 50, and outsole 60 are exposed to an exterior of footwear 10 and cooperatively form a side surface of sole structure 30.

Chamber Configuration

Chamber 50, which is depicted individually in FIGS. 5-7D, is formed from a polymer material that provides a sealed barrier for enclosing a fluid. The polymer material defines an upper surface 51, an opposite lower surface 52, and a sidewall surface 53 that extends around a periphery of chamber 50 and between surfaces 51 and 52. As discussed above, chamber 50 has a shape that generally corresponds with an outline of the foot. As with plate 40 and outsole 60, chamber 50 is exposed to an exterior of footwear 10 and forms a portion of the side surface of sole structure 30. More particularly, sidewall surface 53 is exposed to the exterior of footwear 10 around substantially all of the side surface of sole structure 30.

Chamber 50 includes various bonded areas 54 where upper surface 51 is bonded or otherwise joined to lower surface 52. In general, bonded areas 54 are spaced inward from sidewall surface 53 and form various depressions or indentations in each of surfaces 51 and 52. Some of the depressions in upper surface 51 are shaped to receive various projections that extend downward from plate 40. That is, the projections of plate 40 extend into the depressions formed by portions of bonded areas 54. Similarly, some of the depressions in lower surface 52 are shaped to receive various projections that extend upward from outsole 60. That is, the projections of outsole 60 also extend into the depressions formed by portions of bonded areas 54.

Bonded areas 54 also form various subchambers within chamber 50. For example, a peripheral subchamber 55 extends around the periphery of chamber 50 and a plurality of interior subchambers 56 are centrally-located in chamber 50. Various conduits may connect subchambers 55 and 56 such that the fluid within chamber 50 may pass between subchambers 55 and 56. In some configurations, the conduits may be absent or sealed to prevent fluid transfer between subchambers 55 and 56. When the conduits are absent or sealed, the fluid within subchambers 55 and 56 may be pressurized to different degrees.

In addition to bonded areas 54, an inflation area 57 has a configuration wherein upper surface 51 is bonded or otherwise joined to lower surface 52. Inflation area 57 is spaced inward from sidewall surface 53. More particularly, inflation area 57 is located in midfoot region 12, centered between sides 14 and 15, and extends through a center of one of interior subchambers 56. As described in greater detail below, chamber 50 is inflated through inflation area 57 and has the advantages of (a) imparting a clean, relatively unbroken appearance to sidewall surface 53, (b) reducing the quantity of residual polymer material produced during the manufacturing process, and (c) decreasing the size of a mold that is utilized during the manufacturing process.

The fluid within chamber 50 may range in pressure from zero to three-hundred-fifty kilopascals (i.e., approximately fifty-one pounds per square inch) or more. In addition to air and nitrogen, the fluid contained by chamber 50 may include octafluorapropane or be any of the gasses disclosed in U.S. Pat. No. 4,340,626 to Rudy, such as hexafluoroethane and sulfur hexafluoride, for example. In some configurations, chamber 50 may incorporate a valve that permits the individual to adjust the pressure of the fluid. In other configurations, chamber 50 may be incorporated into a fluid system, as disclosed in U.S. Pat. No. 7,210,249 to Passke, et al., as either a pump chamber or a pressure chamber.

A variety of polymer materials may be utilized for chamber 50. In selecting a polymer material for chamber 50, engineering properties of the polymer material (e.g., tensile strength, stretch properties, fatigue characteristics, dynamic modulus, and loss tangent) as well as the ability of the material to limit the diffusion of the fluid contained by chamber 50 may be considered. When formed of thermoplastic urethane, for example, the polymer material of chamber 50 may have a thickness of approximately 0.89 millimeter, but the thickness may range from 0.25 to 4.0 millimeters or more, for example. In addition to thermoplastic urethane, examples of polymer materials that may be suitable for chamber 50 include polyurethane, polyester, polyester polyurethane, polyether polyurethane, and polyurethane including a polyester polyol. Accordingly, a variety of polymer materials may be utilized for chamber 50.

In manufacturing chamber 50, both a molding process and an inflation process are utilized. The molding process involves shaping a polymer material to define the general configuration of chamber 50. More particularly, the molding process includes shaping the polymer material to form surfaces 51-53 and also form bonded areas 54 to define subchambers 55 and 56. Although not performed during some molding processes, a portion of inflation area 57 may also be formed or otherwise defined. Once the molding process is complete, the inflation process is utilized to pressurize and seal chamber 50.

Molding Process

Figure 8A:
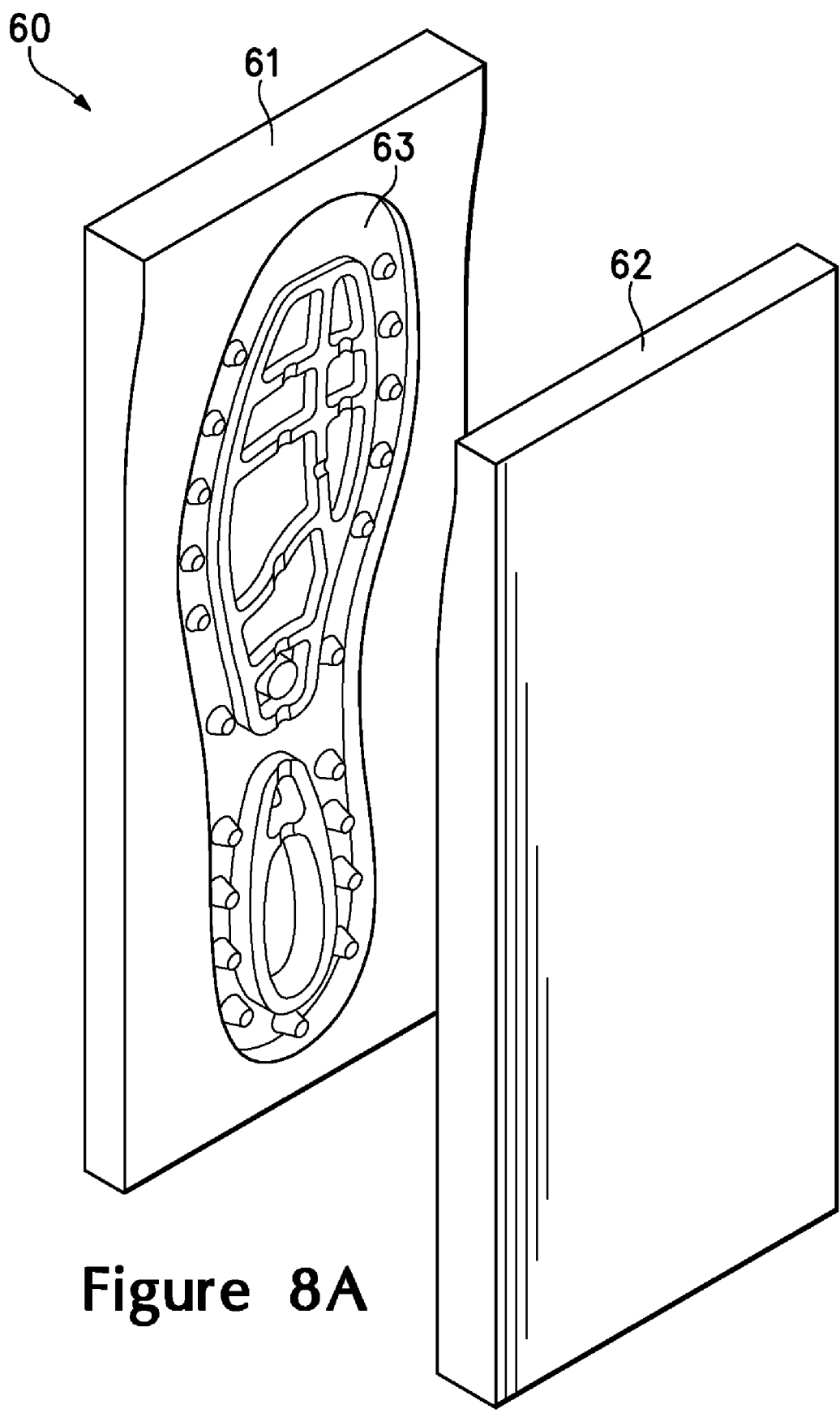
FIGS. 8A-8B are perspective views of a mold for manufacturing the chamber.
Figure 8B:
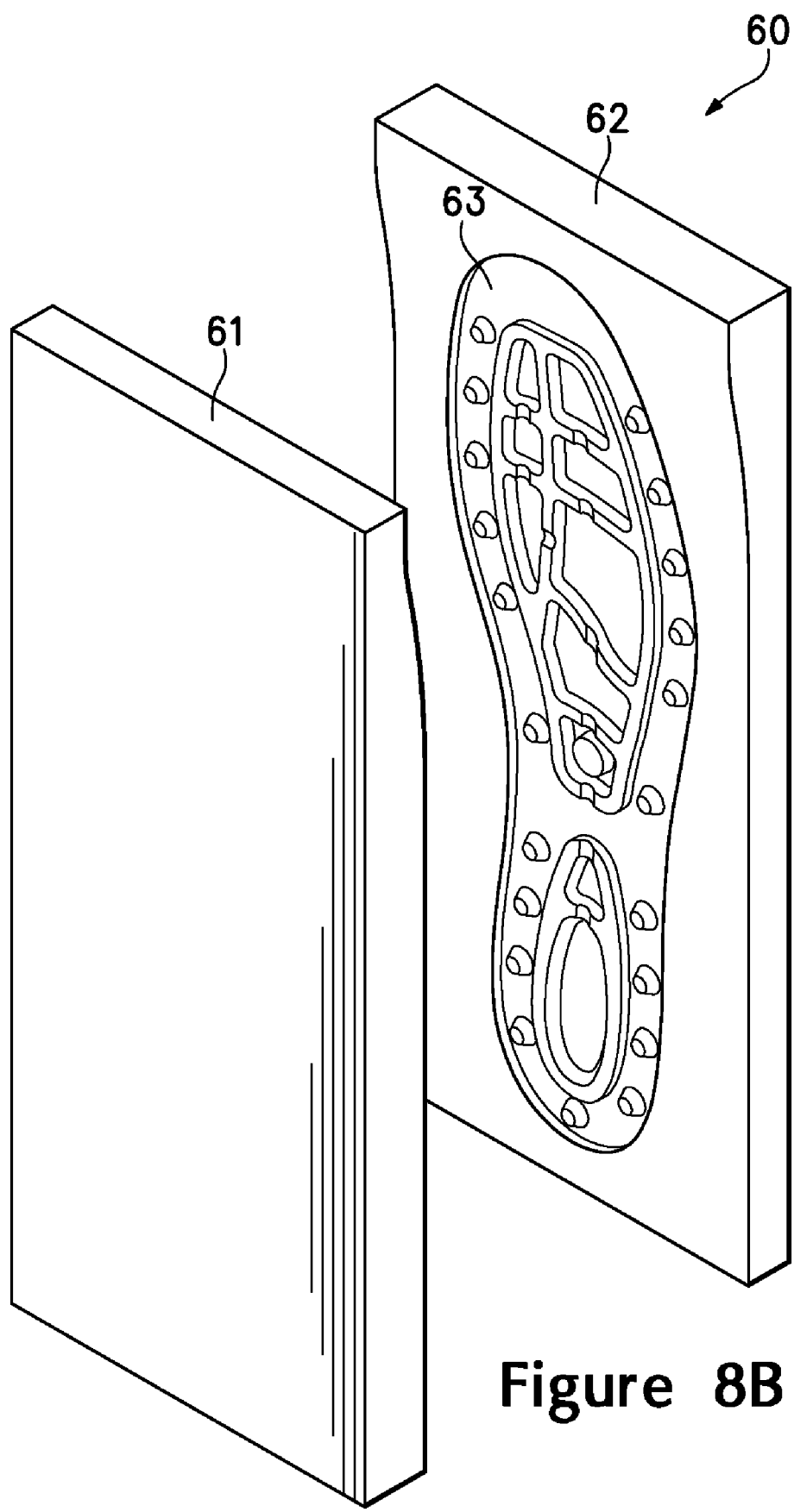

A variety of molding process may be suitable for chamber 50, including a blowmolding process. Referring to FIGS. 8A and 8B, a mold 60 has a first mold portion 61 and a second mold portion 62. Each of mold portions 61 and 62 cooperatively define an internal cavity 63 with the configuration of chamber 50. When mold portions 61 and 62 are joined together, therefore, cavity 63 has dimensions substantially corresponding with the exterior dimensions of chamber 50 in an unpressurized state. In other configurations, mold portions 61 and 62 may cooperatively define two internal cavities 63, one having the configuration of chamber 50, which is suitable for footwear 10 when configured for the right foot of the individual, and the other having the configuration of a mirror image of chamber 50, which is suitable for footwear 10 when configured for the left foot of the individual.

Figure 9A:
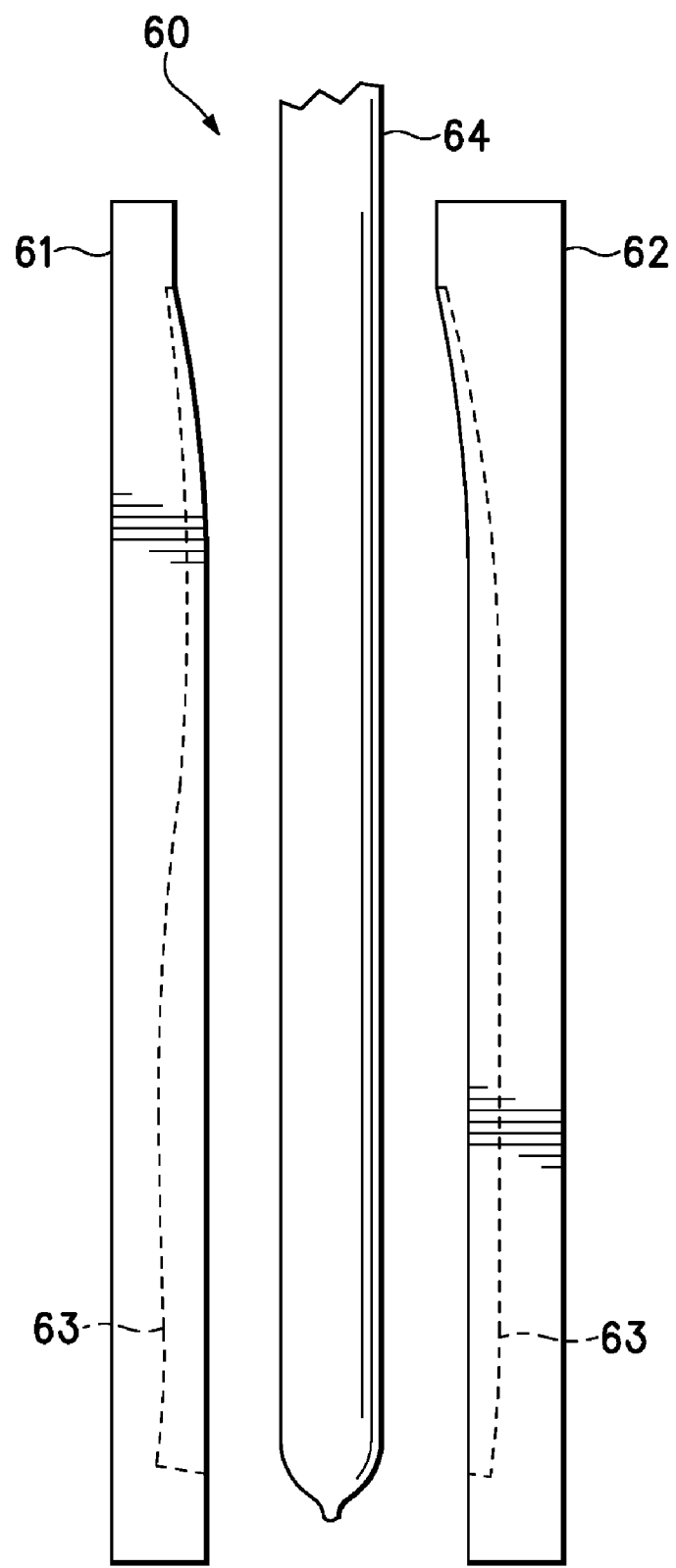
FIGS. 9A-9C are side elevational views of the mold depicting a blowmolding process for the chamber.

The manner in which mold 60 is utilized to form chamber 50 from a polymer material will now be discussed in greater detail. Initially, a parison 64 is located between mold portions 61 and 62, as depicted in FIG. 9A. Parison 64 is formed from a molten, semi-molten, or at least partially uncured polymer material having a tubular configuration. Although parison 64 may have a circular cross-section, parison 64 may also be formed to have an elliptical or otherwise elongate cross-section. Although a wall thickness of parison 64 may be uniform, some areas of parison 64 may have different thicknesses to accommodate the forming of chamber 50.

Figure 9B:
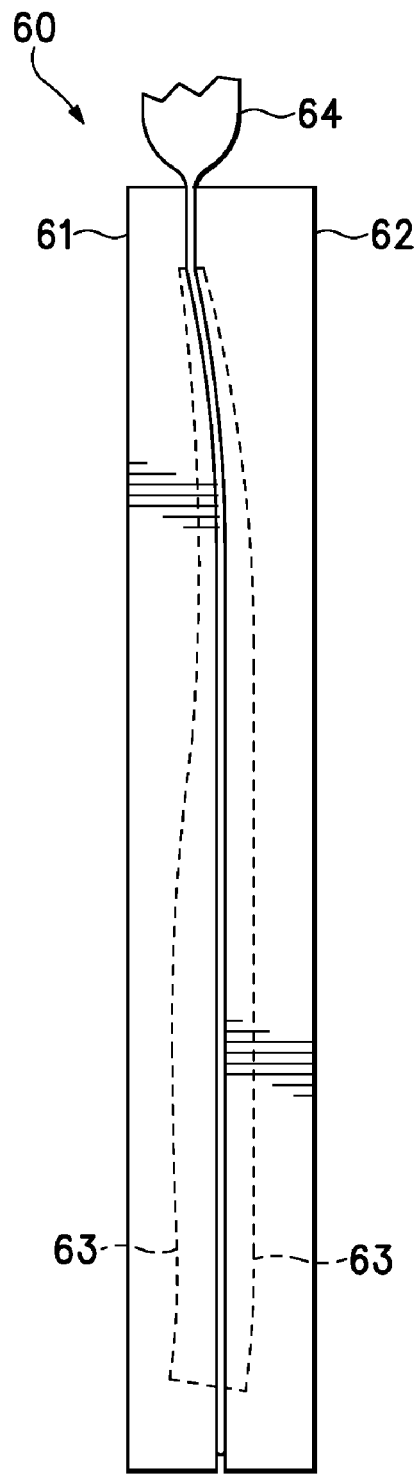

Once parison 64 is properly located between mold portions 61 and 62, mold 60 closes such that the polymer material of parison 64 enters cavity 63 and is shaped to conform with cavity 63, as depicted in FIG. 9B. That is, mold portions 61 and 62 translate toward each other to close upon parison 64 and draw the polymer material of parison 64 into cavity 63. As mold 60 contacts parison 64, air or another fluid having a positive pressure in comparison with ambient air may be injected into a hollow, central area of parison 64 to induce the polymer material to contact and conform to the contours of mold portions 61 and 62. Air may also be removed from the area between parison 64 and mold portions 61 and 62 through various vents, thereby drawing the polymer material of parison 64 onto the surfaces of cavity 63. That is, at least a partial vacuum may be formed between an exterior of parison 64 and the surfaces of mold portions 61 and 62. As the area within parison 64 is pressurized and air is removed from the area between parison 64 and mold 60, the polymer material is drawn against and conforms with the surfaces of mold 60. More specifically, the polymer material of parison 64 stretches, bends, or otherwise conforms to extend along the surfaces of cavities 63 within mold 60 and form the general shape of chamber 50. In addition to being shaped, opposite sides of parison 64 are bonded to each other in various locations. More particularly, mold portions 61 and 62 compress opposite sides of parison 64 together at (a) a location corresponding with sidewall surface 63 and (b) at locations corresponding with the various bonded areas 54.

A parting line is formed where the opposite sides of parison 64 are bonded together along sidewall surface 63. The parting line is, therefore, an area of chamber 50 where opposite sides of parison 64 are bonded together. Although the parting line may extend along a center of sidewall surface 53 (i.e., located between and spaced equally from surfaces 51 and 62), the parting line may also be located at an interface between sidewall surface 53 and either of surfaces 51 and 52. In some configurations, the parting line may also be located at the interface between sidewall surface 53 and upper surface 51 in a portion of chamber 50, and located at the interface between sidewall surface 53 and lower surface 52 in another portion of chamber 50. Accordingly, the location of the parting line may vary significantly.

Figure 9C:
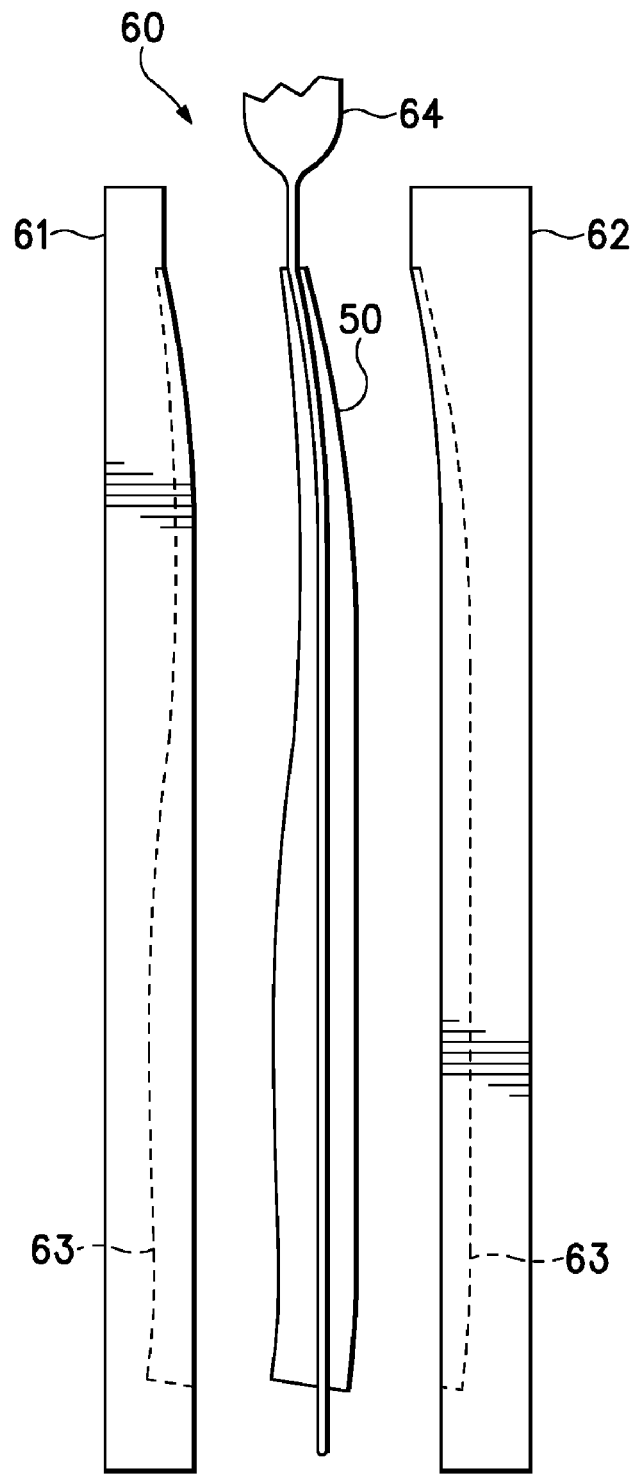
Figure 10:
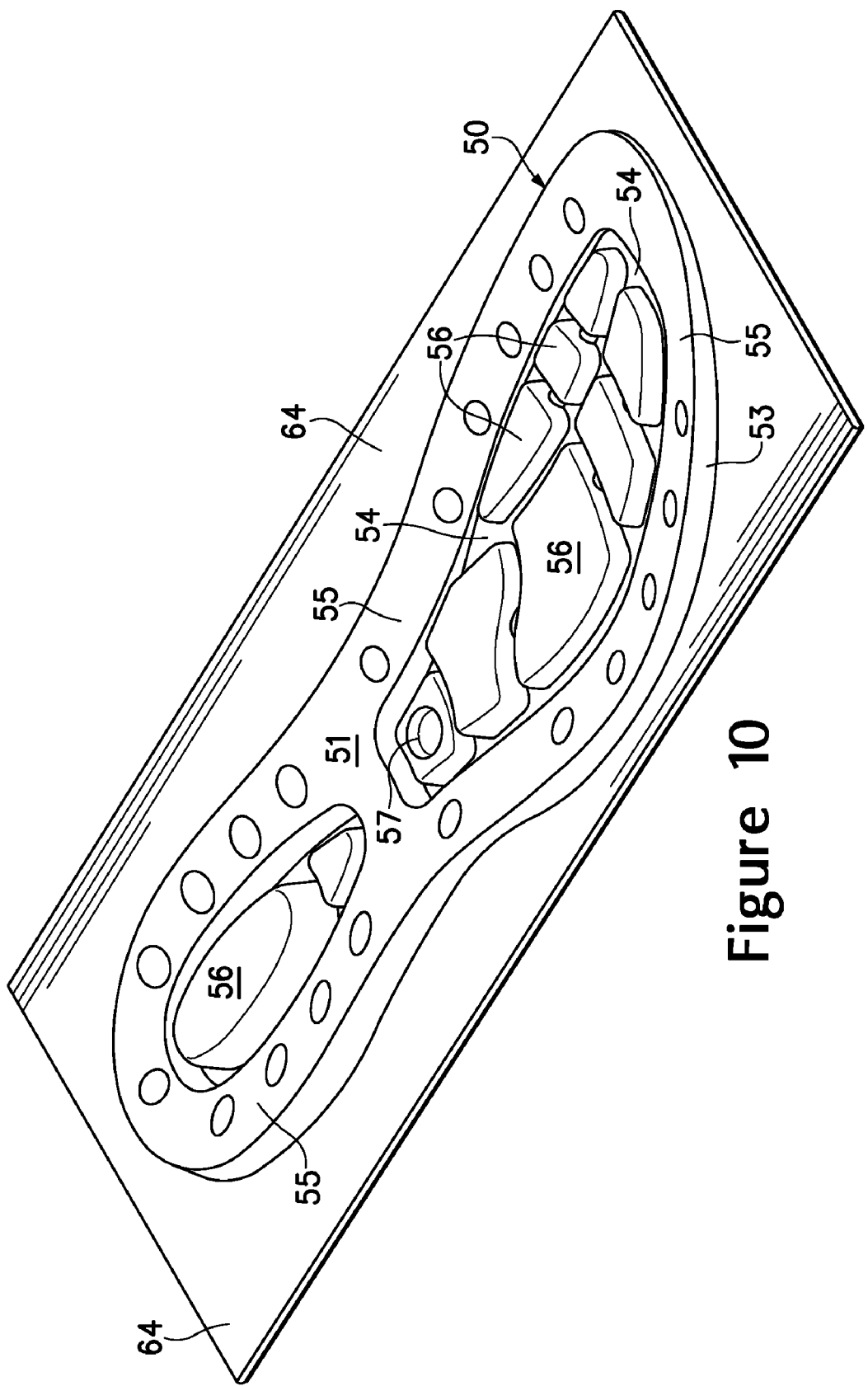
FIG. 10 is a perspective view of the chamber and residual polymer material following the blowmolding process.
Figure 11:
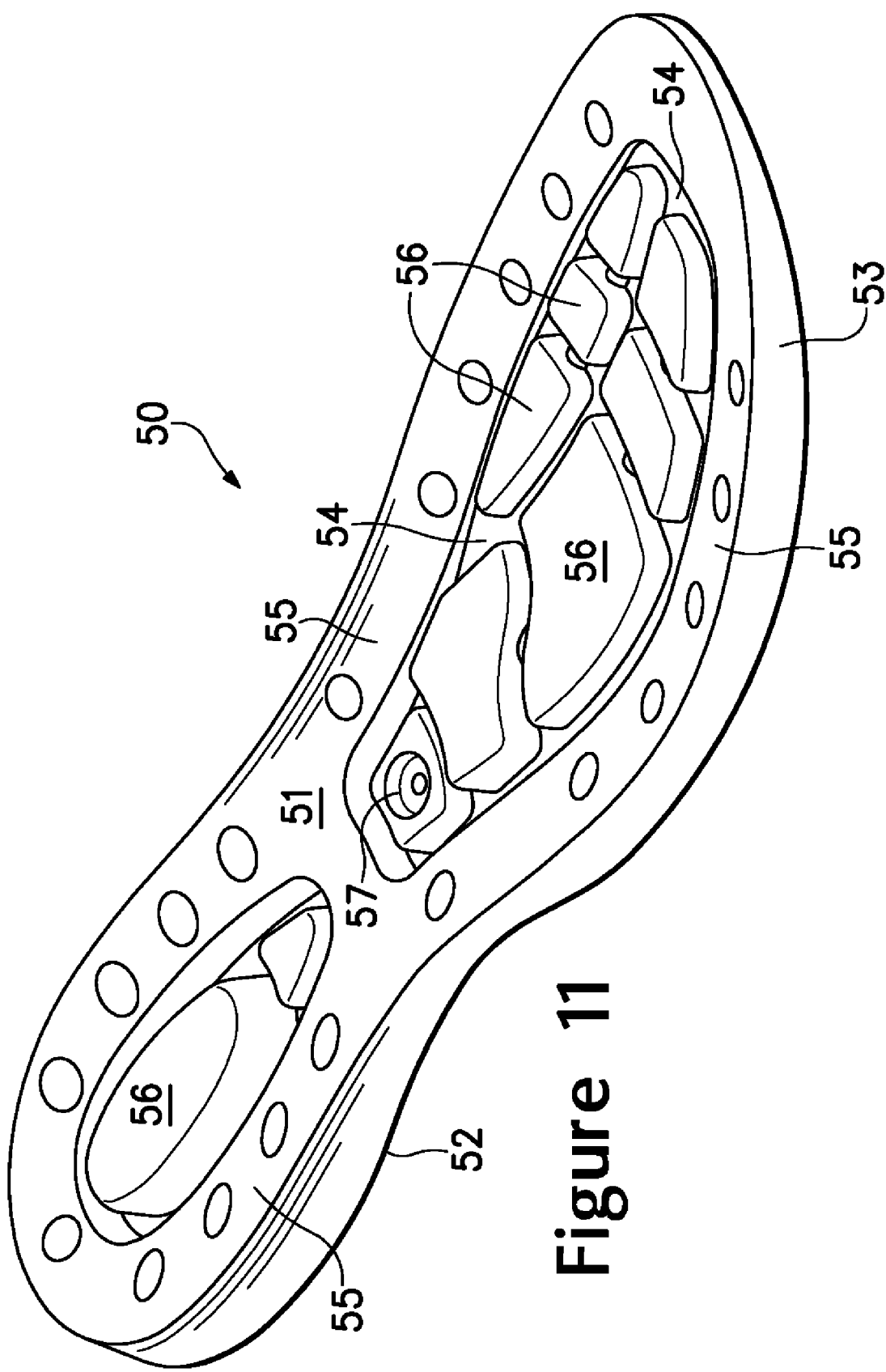
FIG. 11 is a perspective view of the chamber following removal of the residual polymer material.

Once chamber 50 is formed within mold 60, mold portions 61 and 62 separate such that chamber 50 and residual portions of parison 64 may be removed from mold 60, as depicted in FIGS. 9C and 10. Chamber 50 is then permitted to cool, and the residual portions of parison 64 are detached, as depicted in FIG. 11. When formed from a thermoplastic polymer, for example, the residual portions may be recycled and utilized in other chambers. At this stage of manufacturing, chamber 50 is substantially formed to exhibit the configuration depicted in FIGS. 5-7D, but is substantially unpressurized. FIGS. 12A-12D depict various cross-sections through chamber 50 following removal from mold 60. In comparing FIGS. 12A-12D with corresponding FIGS. 7A-7D, surfaces 51-53 bulge outward to a lesser degree due to the unpressurized fluid within chamber 50. A further difference between FIGS. 12A-12D and FIGS. 7A-7D relates to inflation area 57. Whereas the portions surfaces 51 and 52 that form inflation area 57 are bonded together in FIGS. 7B and 7D, the portions of surfaces 51 and 52 that form inflation area 57 are unbonded and spaced from each other in FIGS. 12B and 12D. Although mold 60 formed depressions in each of surfaces 51 and 52 at inflation area 57, the depressions are spaced from each other and unbonded to each other. In some configurations, mold 60 may form an inflation area 57 wherein depressions are absent in surfaces 51 and 52.

An alternative to the blowmolding process discussed above, a thermoforming process may be utilized to form chamber 50. Whereas parison 64 is utilized in the blowmolding process, two sheets of thermoplastic polymer material are utilized in the thermoforming process. In general, the sheets are heated and placed between mold portions 61 and 62. Mold 60 then closes upon the sheets such that the sheets are drawn into cavity 63 and against the contours of the mold. Either or both of a vacuum on the exterior of the sheets and pressure between the sheets may be used to ensure that the sheets contact the surfaces of cavity 63. As with the blowmolding process, the mold shapes the sheets and forms bonded areas 54. Upon removal from mold 60, chamber 50 (when formed from the thermoforming process) is substantially unpressurized, but has the general shape of chamber 50 when pressurized. More particularly, each of surfaces 51 and 52 are contoured to have the general contours of chamber 50 in the pressurized state, and the interior of chamber 50 defines air or fluid spaces wherein surfaces 51 and 52 are spaced from each other. In inflation area 57, for example, surfaces 51 and 52 are spaced from each other to form an air or fluid gap between surfaces 51 and 52.

Inflation Process

Figure 13A:
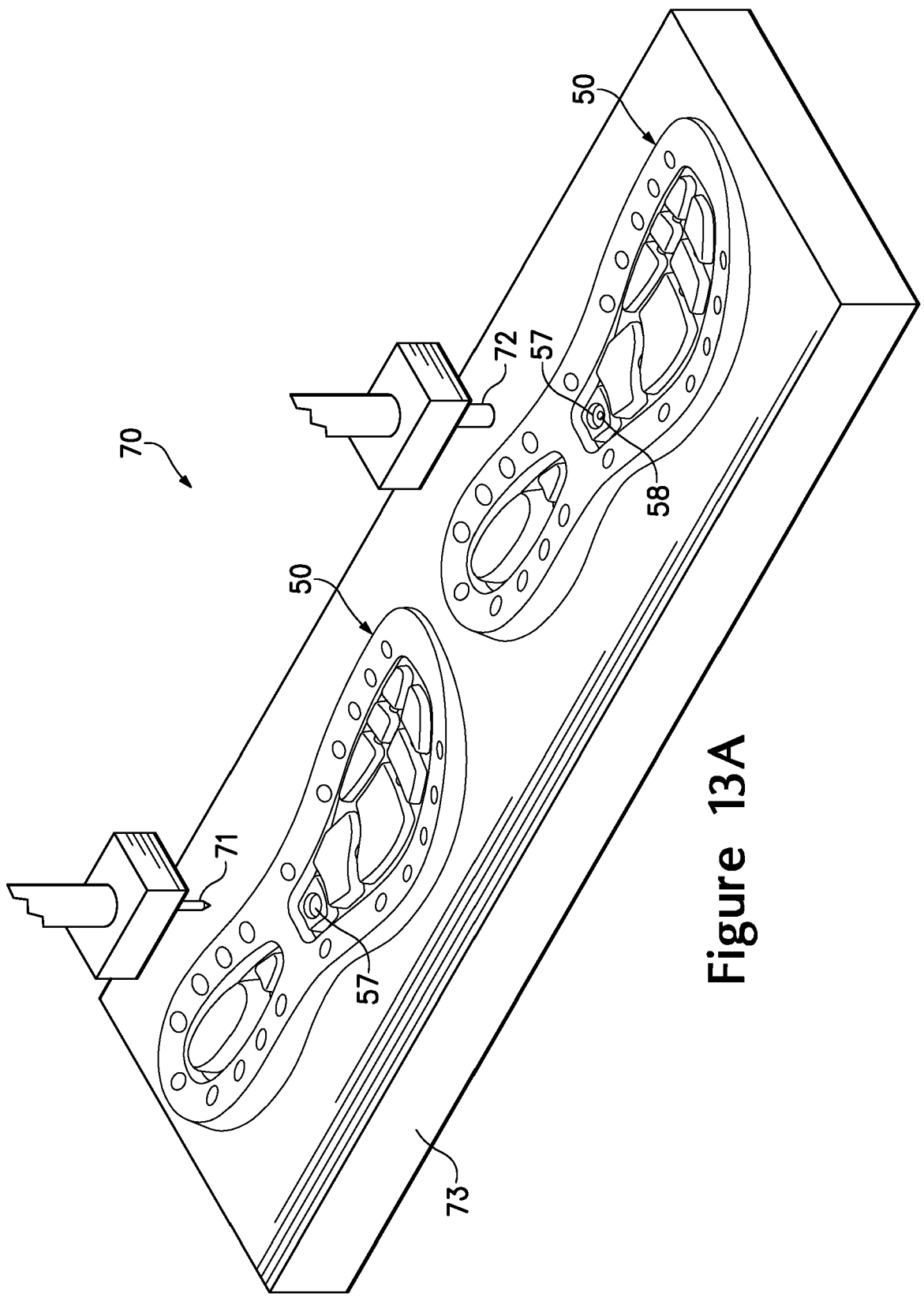

Following the molding process, chamber 50 is pressurized through the inflation process. An inflation apparatus 70 is schematically depicted in FIGS. 13A and 13B as including a punch 71, a die 72, and a platen 73. Whereas the position of platen 73 may remain fixed, punch 71 and die 72 are mechanically-configured to individually translate toward platen 73 and away from platen 73. As described in greater detail below, one or more chambers 50 may be located on platen 73, and punch 71 is utilized to form an aperture in either of surfaces 51 and 52 at inflation area 57. Die 72 then contacts inflation area 57 and a fluid is injected into chamber 50 through the aperture. Once chamber 50 is pressurized with the fluid, die 72 compresses surfaces 51 and 52 together and forms a bond at inflation area 57 and around the aperture to effectively seal the pressurized fluid within chamber 50. Accordingly, die 72 may be utilized to both pressurize and bond chamber 50.

Figure 14A:
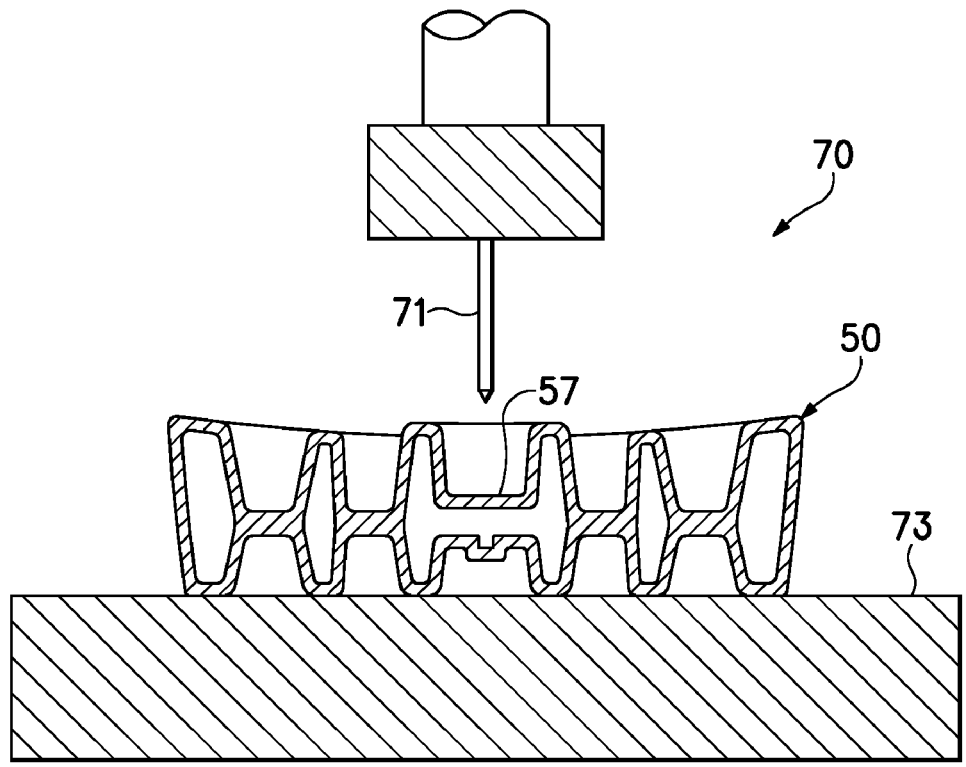
FIGS. 14A-14F are schematic cross-sectional views depicting an inflation process for the chamber.
Figure 14B:
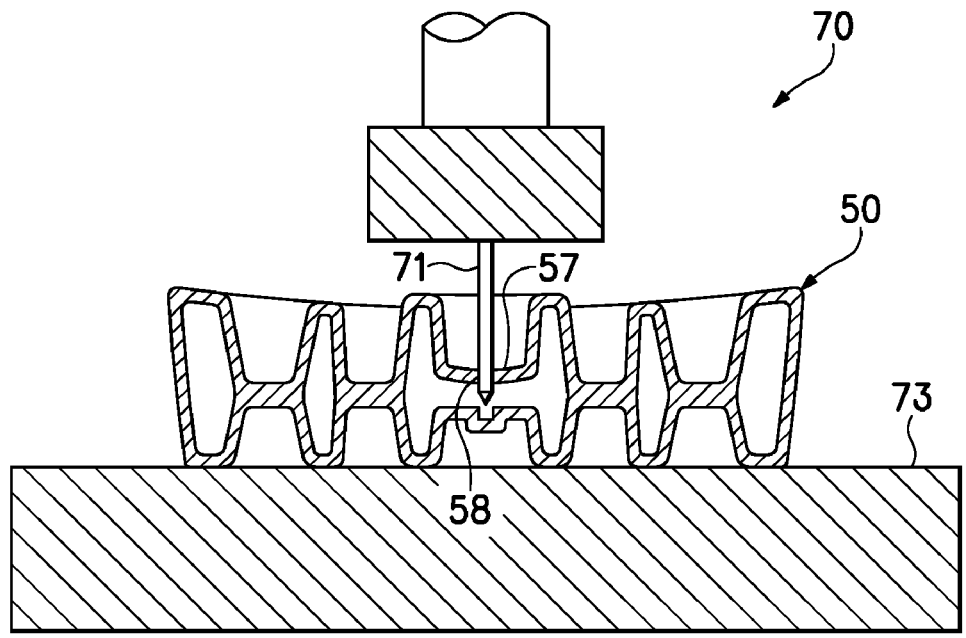

The inflation process will now be discussed in greater detail. Referring to FIG. 14A, chamber 50 is depicted as being located upon platen 73 and punch 71 is positioned above inflation area 57. Although chamber 50 is substantially unpressurized at this stage of manufacturing, air or another fluid is sealed within chamber 50. Punch 71 then translates or otherwise moves downward and pierces upper surface 51 in inflation area 57 to form an aperture 58, as depicted in FIG. 14B. Although punch 71 is depicted as piercing upper surface 51, punch 71 may also pierce lower surface 52 or both of surfaces 51 and 52.

Figure 14C:
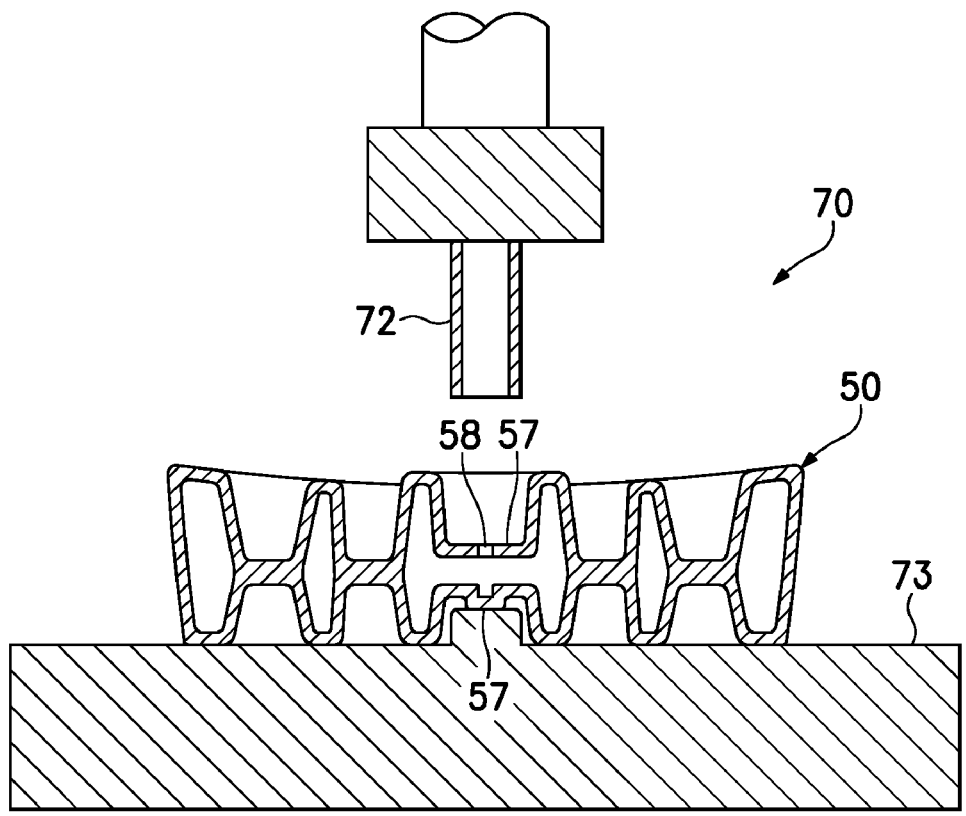

Once aperture 58 is formed, thereby proving a means for introducing the pressurized fluid, die 72 is positioned above inflation area 57, as depicted in FIG. 14C. As depicted in FIG. 13A, punch 71 is associated with one area of platen 73, and die 72 is associated with another area of platen 73. Accordingly, chamber 50 may be moved from the area of punch 71 to the area of die 72 to position die 72 above inflation area 57. In other configurations, die 72 may change positions with punch 71 such that chamber 50 may remain in one position throughout the inflation process. In yet other configurations, punch 71 and die 72 may be incorporated into a single unit in order to enhance the efficiency of the inflation process.

Figure 14D:
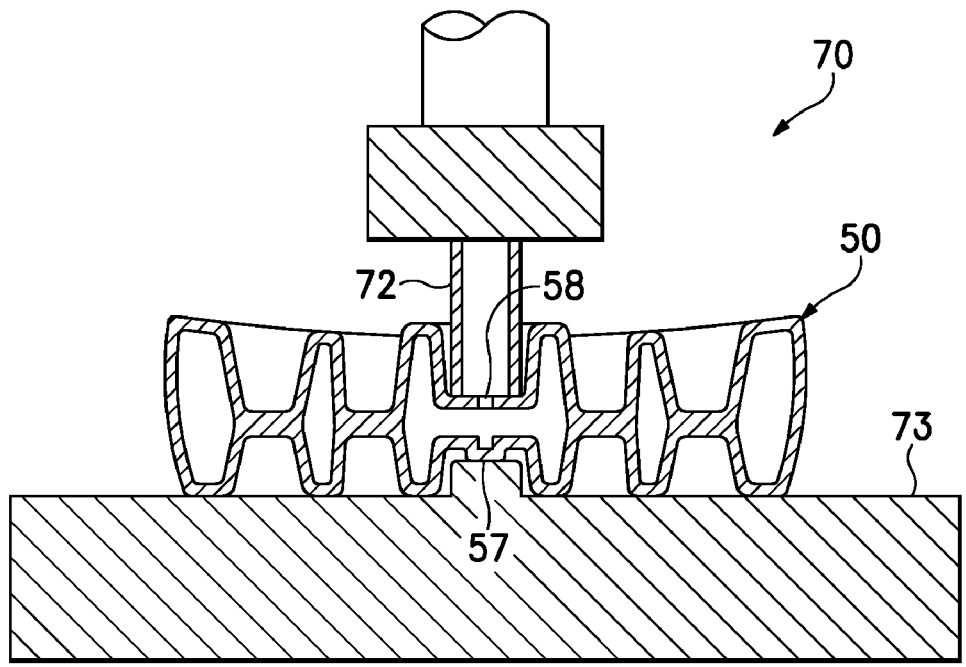

Die 57 has a generally cylindrical configuration with a hollow interior. Although not depicted, die 57 may be operatively connected to a fluid source that releases the pressurized fluid into the hollow interior. Once positioned, die 72 translates or otherwise moves downward and contacts upper surface 51 in inflation area 57 such that sidewalls of die 72 extend around aperture 58, as depicted in FIG. 14D. At this stage, the fluid source may be used to pressurize the hollow interior of die 57, and the pressurized fluid passes through aperture 58 to also pressurize chamber 50. In some inflation processes, a two-stage pressurization process may be utilized. More particularly, an initial and relatively low pressurization may occur to create a seal between die 72 and inflation area 57, and then a subsequent and relatively high pressurization may occur once the seal is created. That is, the hollow interior of die 72 may first be pressurized at a relatively low level to form a seal, and subsequently pressurized at a relatively high level.

Figure 14E:
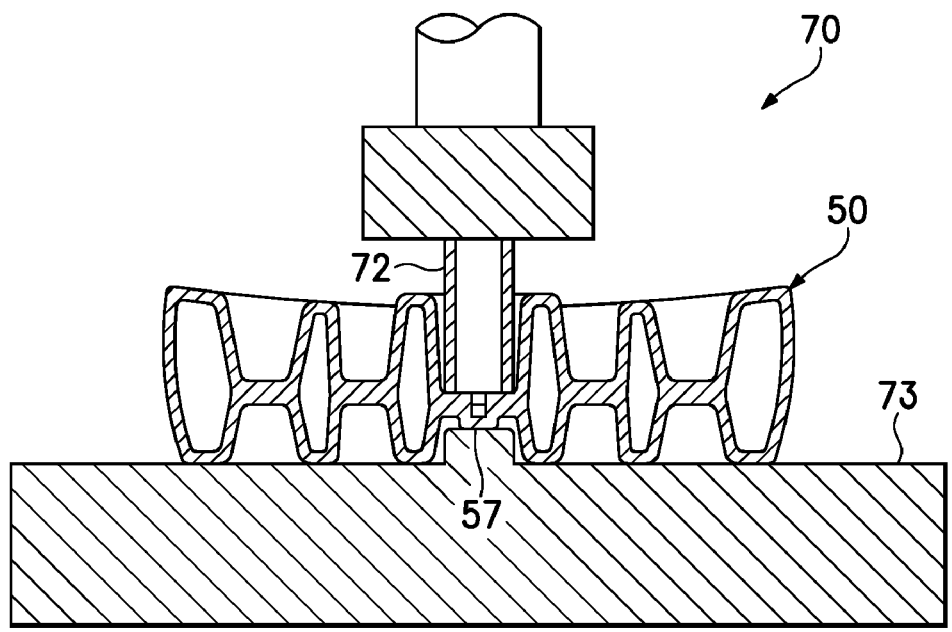
Figure 14F:
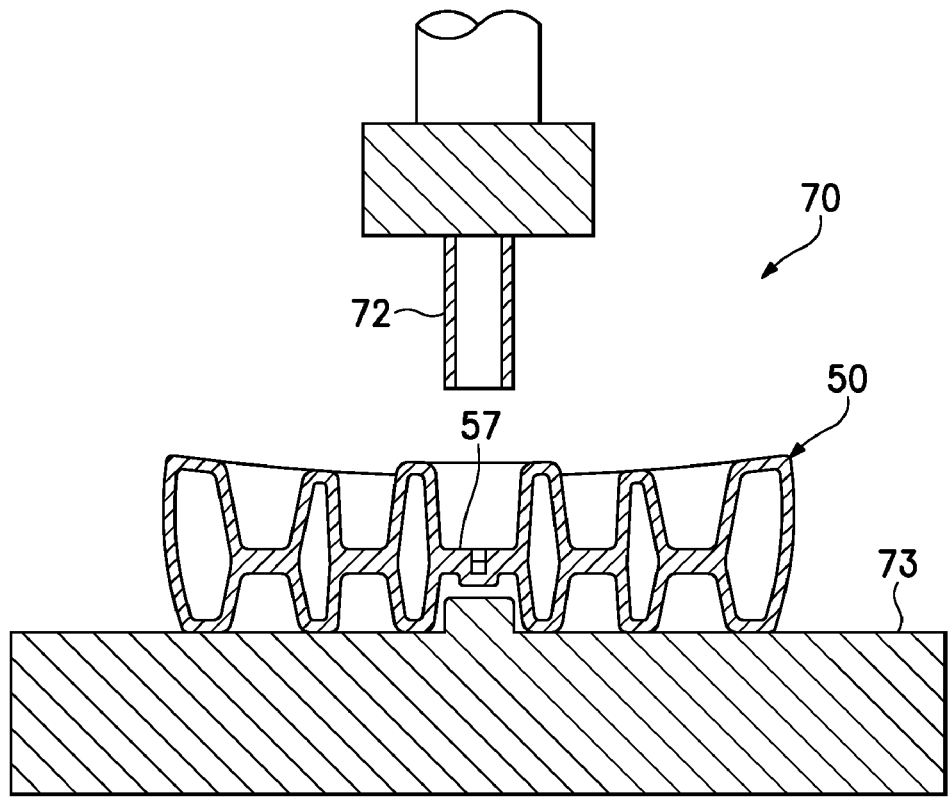

Following the pressurization of chamber 50, die 72 translates further downward to compress upper surface 51 against lower surface 52 in inflation area 57, as depicted in FIG. 14E. Once surfaces 51 and 52 are compressed, die 72 forms a bond between surfaces 51 and 52 in inflation area 57. A variety of bonding techniques may be utilized to form the bond around the aperture, including radio frequency bonding, adhesive bonding, and thermobonding. If radio frequency bonding is utilized, for example, radio frequency energy (RF energy) may be emitted by die 72 in order to heat the polymer material in inflation area 57. More particularly, the radio frequency energy may pass from die 72 to plate 73, thereby passing through inflation area 57 and heating the polymer material. Upon cooling, die 72 may be retracted to substantially complete the manufacture of chamber 50, as depicted in FIG. 14F.

As discussed above, die 72 has a cylindrical configuration with a hollow interior. A lower surface of die 72 has, therefore, a circular shape. When in contact with upper surface 51, the circular shape extends around aperture 58 and prevents the pressurized fluid from escaping. The circular shape also forms a circular bond that extends around aperture 58 and effectively seals the pressurized fluid within chamber 50.

One advantage to the inflation process relates to sidewall surface 53. In some prior chambers, an inflation conduit was formed in the residual polymer material during the bonding process. The inflation conduit extended outward from a sidewall of a chamber and was utilized to direct a pressurized fluid into the chamber. Once pressurized, the inflation conduit was sealed and trimmed adjacent to the sidewall. When encapsulated within a polymer foam material, the sealed inflation conduit would not be visible. In footwear 10, however, sidewall surface 53 is exposed to the exterior of footwear 10 around substantially all of the side surface of sole structure 30. By locating inflation area 57 at an interior of chamber 50, inflation area 57 is not visible or only minimally visible from the side surface of sole structure 30. Accordingly, the inflation process imparts a clean, relatively unbroken appearance to sidewall surface 53. Although inflation area 57 is located in midfoot region 12 and centered between sides 14 and 15, inflation area 57 may also be located in either of regions 11 and 13 and may be adjacent to or spaced from sides 14 and 15.

Another advantage relates to the residual polymer material from parison 64. When a chamber is formed with an inflation conduit, the inflation conduit extends outward and into the residual polymer material, thereby requiring that the residual polymer material have a size that accommodates formation of the inflation conduit. By eliminating the inflation conduit, however, the inflation process, reduces the quantity of residual polymer material produced during the manufacturing process. As a related advantage, the size of a mold may be reduced given that the mold does not also form the inflation conduit. Accordingly, the inflation process decreases the size of a mold that is utilized during the manufacturing process.

Figure 7A:
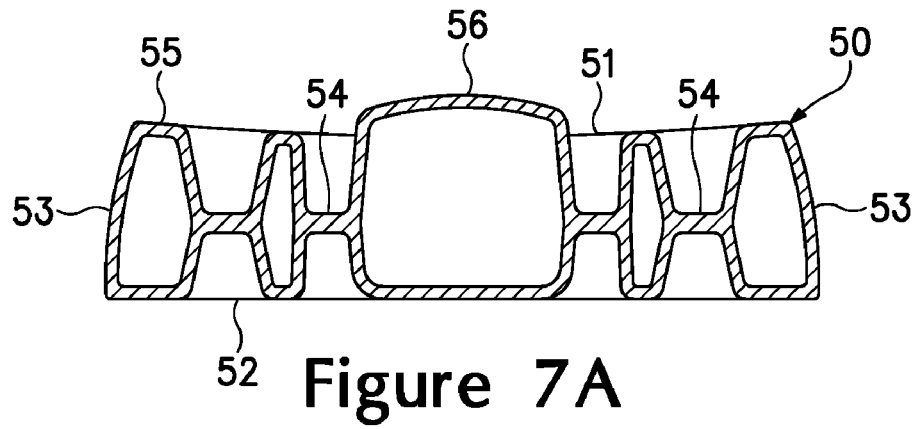
FIG. 7A-7D are cross-sectional views of the chamber, as defined by section lines 7A-7D in FIG. 6.
Figure 7B:
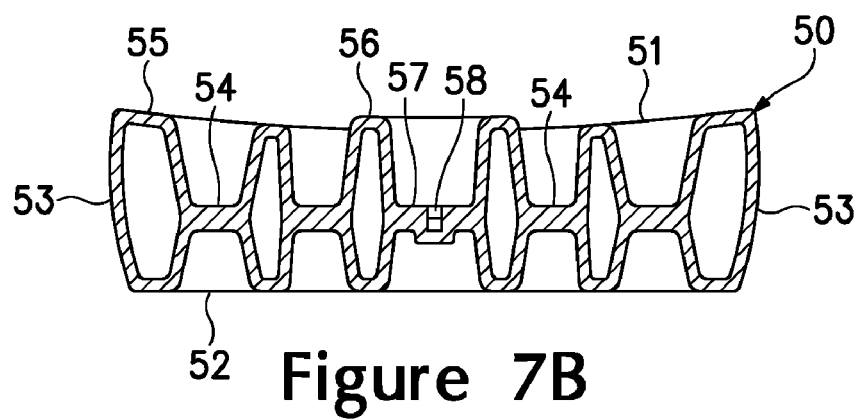
Figure 7C:
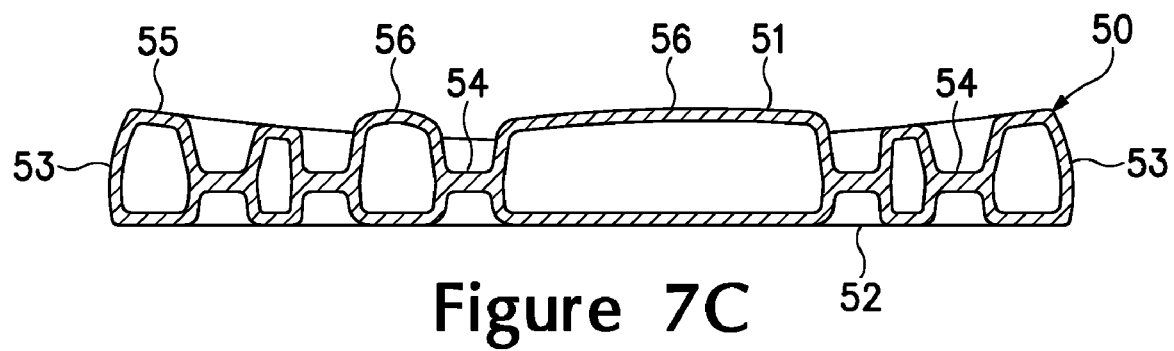
Figure 7D:
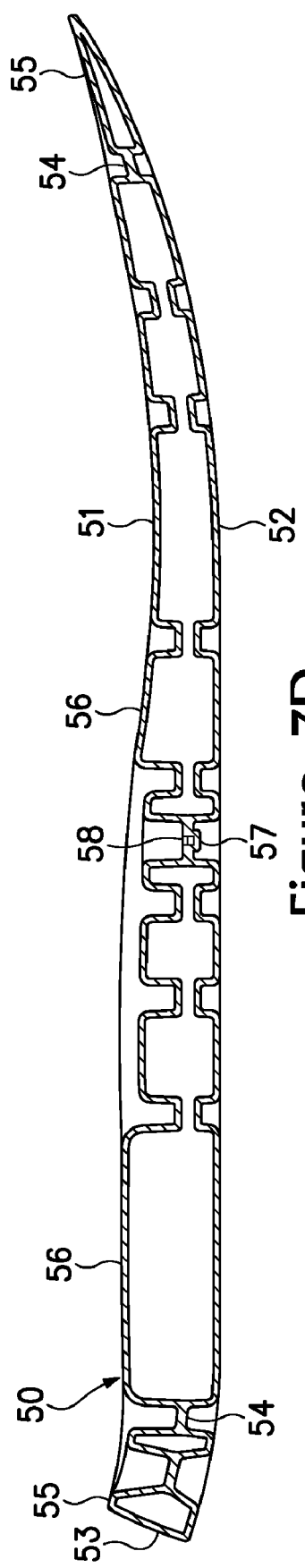
Figure 12A:
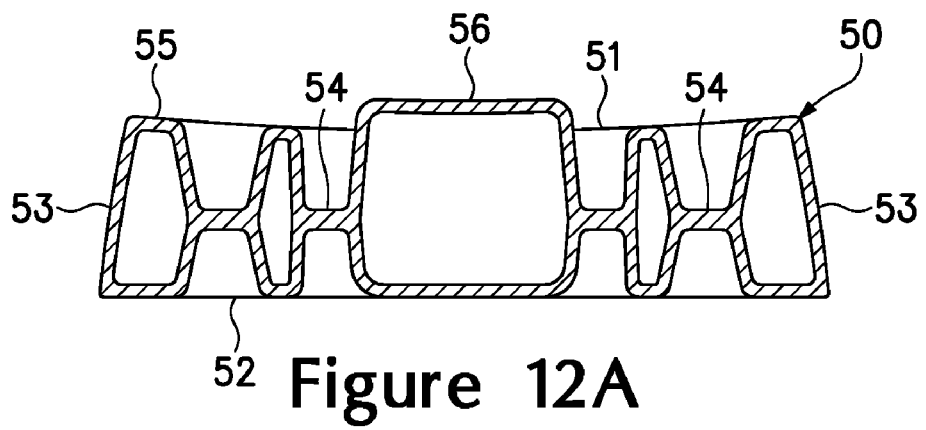
FIGS. 12A-12D are cross-sectional views of the chamber, as defined by section lines 12A-12D in FIG. 11.
Figure 12B:
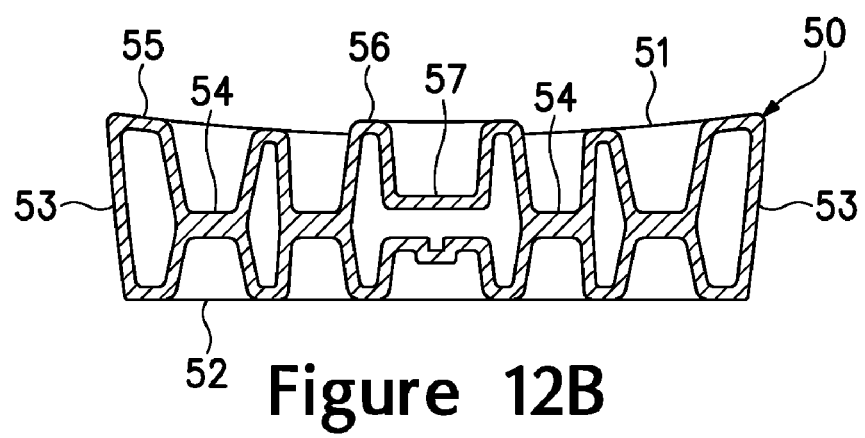
Figure 12C:
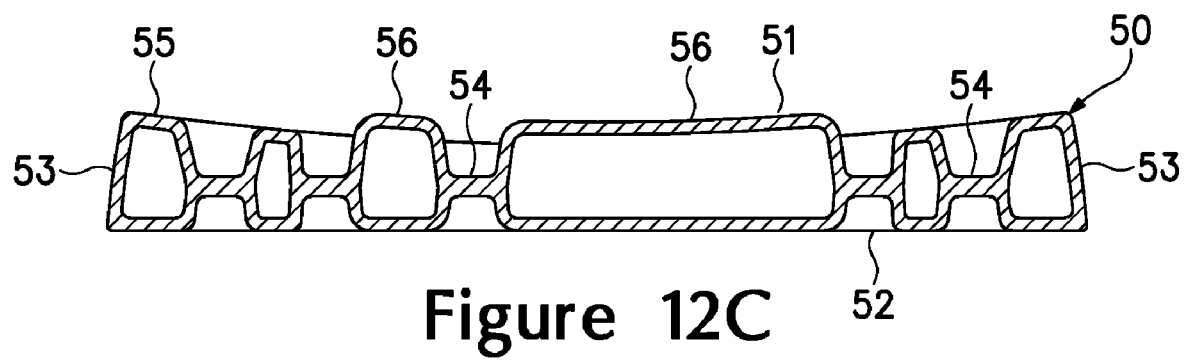
Figure 12D:
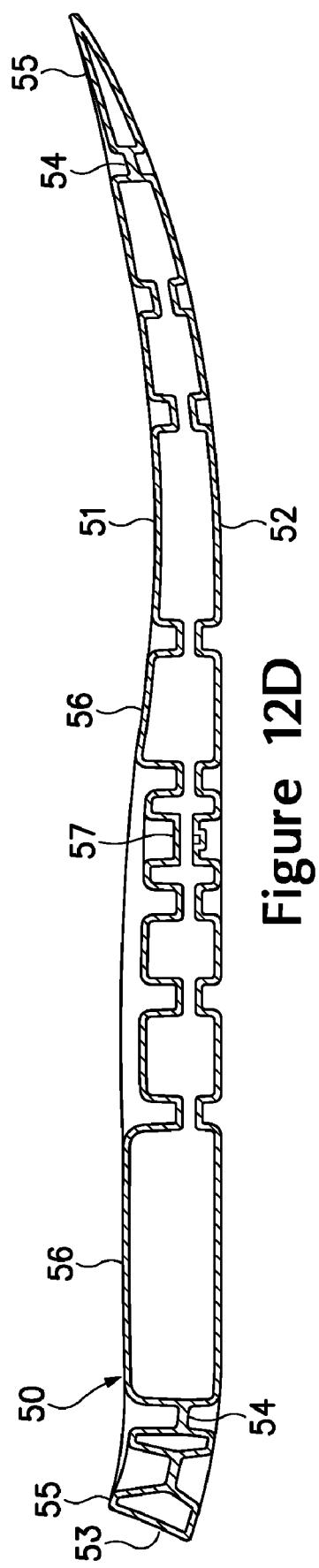

In comparing FIGS. 12A-12D with corresponding FIGS. 7A-7D, the portions of surfaces 51 and 52 that form inflation area 57 are unbonded and spaced from each other in FIGS. 12B and 12D, and the portions surfaces 51 and 52 that form inflation area 57 are bonded together in FIGS. 7B and 7D. By initially spacing the portions of surfaces 51 and 52 that form inflation area 57, punch 71 may form a single aperture in chamber 50 (e.g., through upper surface 51), rather than apertures through both of surfaces 51 an 52. Following the inflation process, however, the portions surfaces 51 and 52 that form inflation area 57 are bonded together in an unspaced configuration.

Figure 15:
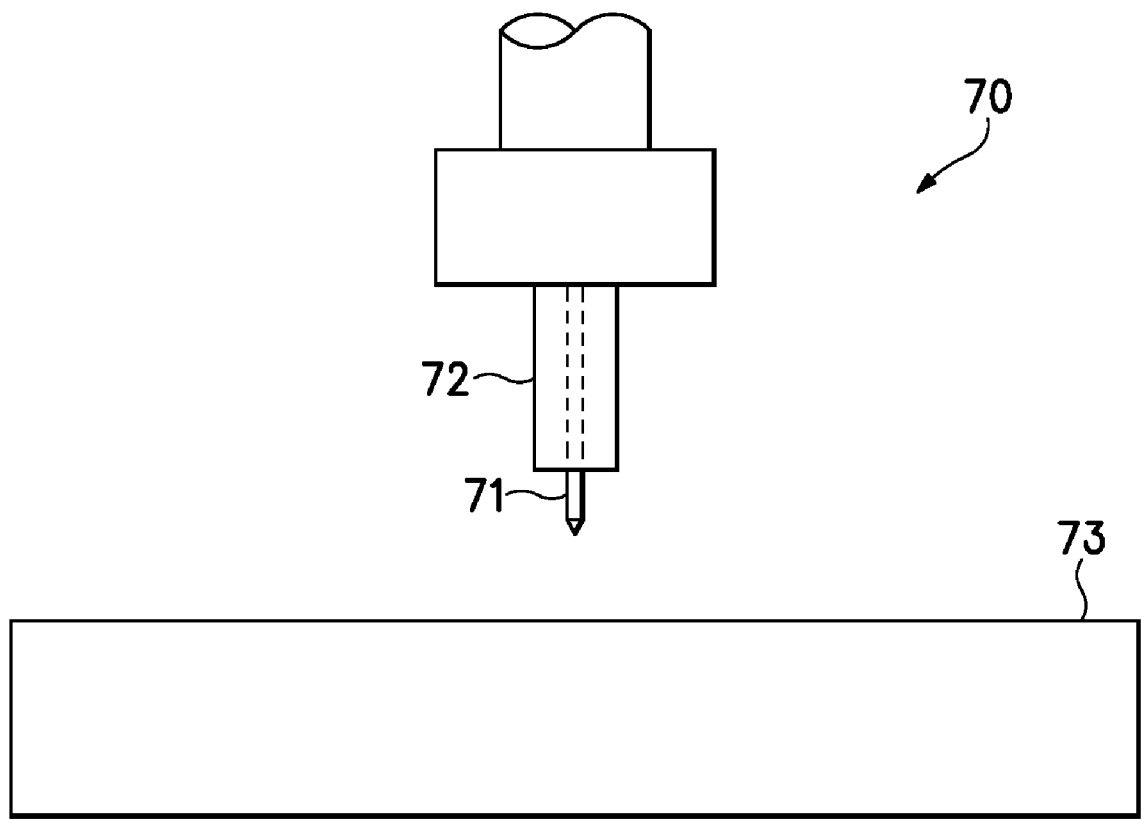
FIG. 15 is a side elevational view of another configuration of the inflation apparatus.

The inflation process discussed above provides an example of a suitable inflation process for chamber 50 and a variety of other chambers. Various aspects of the inflation process may, however, be modified to enhance efficiency or otherwise provide additional benefits. As an example, punch 71 and die 72 may be incorporated into a single unit, as depicted in FIG. 15, in order to enhance the efficiency of the inflation process. More particularly, punch 71 may extend through the hollow interior of die 72. Once punch 71 forms aperture 58, punch 71 may retract to permit die 72 to contact, pressurize, and bond chamber 50. In addition, a substantially identical inflation process may be utilized when chamber 50 is formed through a thermoforming process.

Molding And Inflation Process Variation

Figure 16:
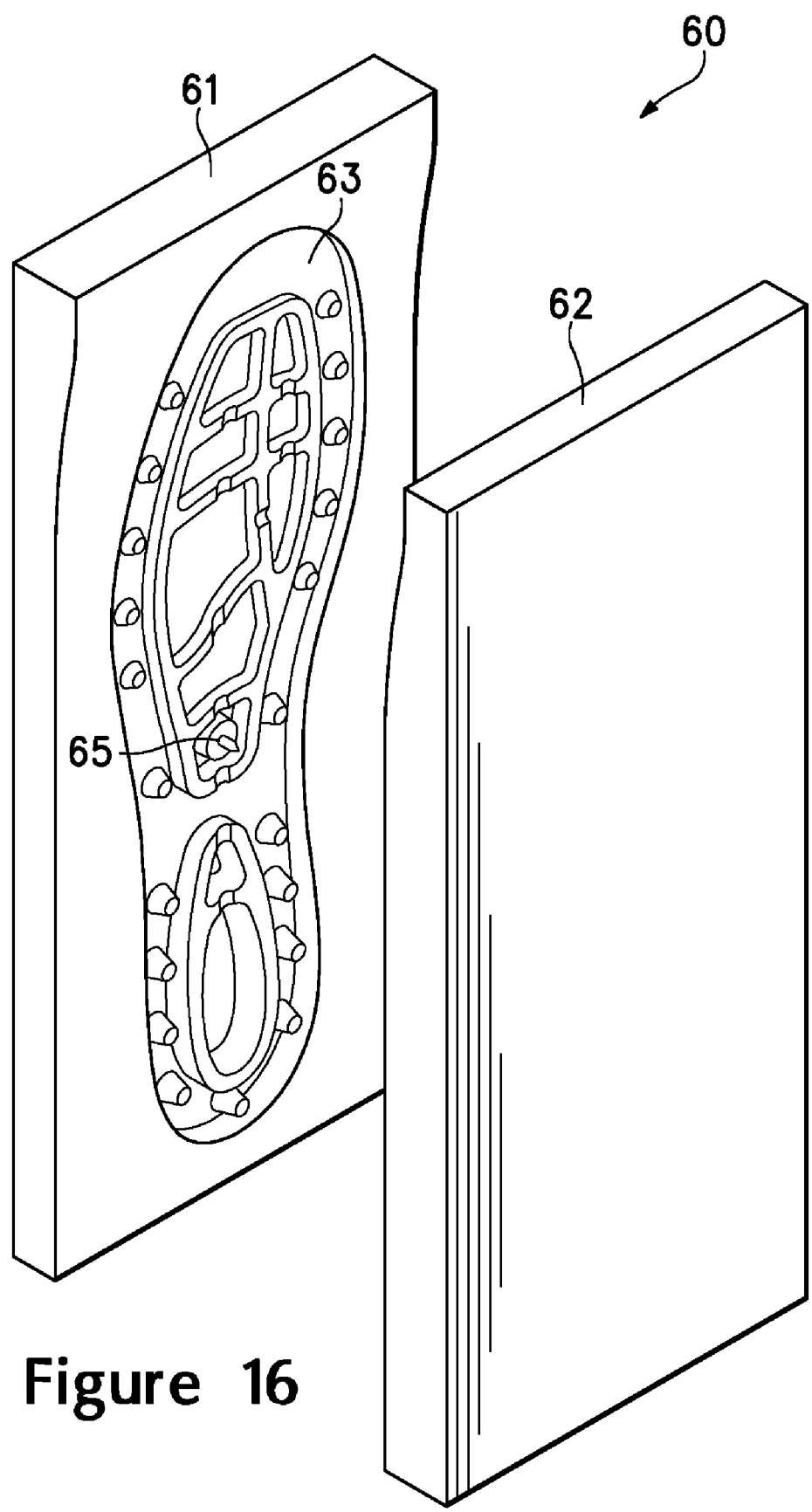
FIG. 16 is a perspective view of another configuration of the mold.

In processes discussed above, chamber 50 is formed to have a sealed configuration, and punch 71 is subsequently used to form aperture 58. As an alternative, mold 60 may incorporate a needle 65, as depicted in FIG. 16. During the molding process, needle 65 pierces or otherwise extends through one side of parison 64 to form aperture 58. Once an end of needle 65 is located within parison 64, a fluid may be ejected from needle 65 to pressurize the interior of parison 64, thereby inducing the polymer material to contact and conform with the contours of mold 60. Accordingly, needle 65 may be utilized to (a) form aperture 58 during the molding of chamber 50 and (b) assist with forming chamber 50. When chamber 50 is removed from mold 60 and residual polymer material is trimmed as, depicted in FIG. 17, aperture 58 is formed in inflation area 57.

Figure 18A:
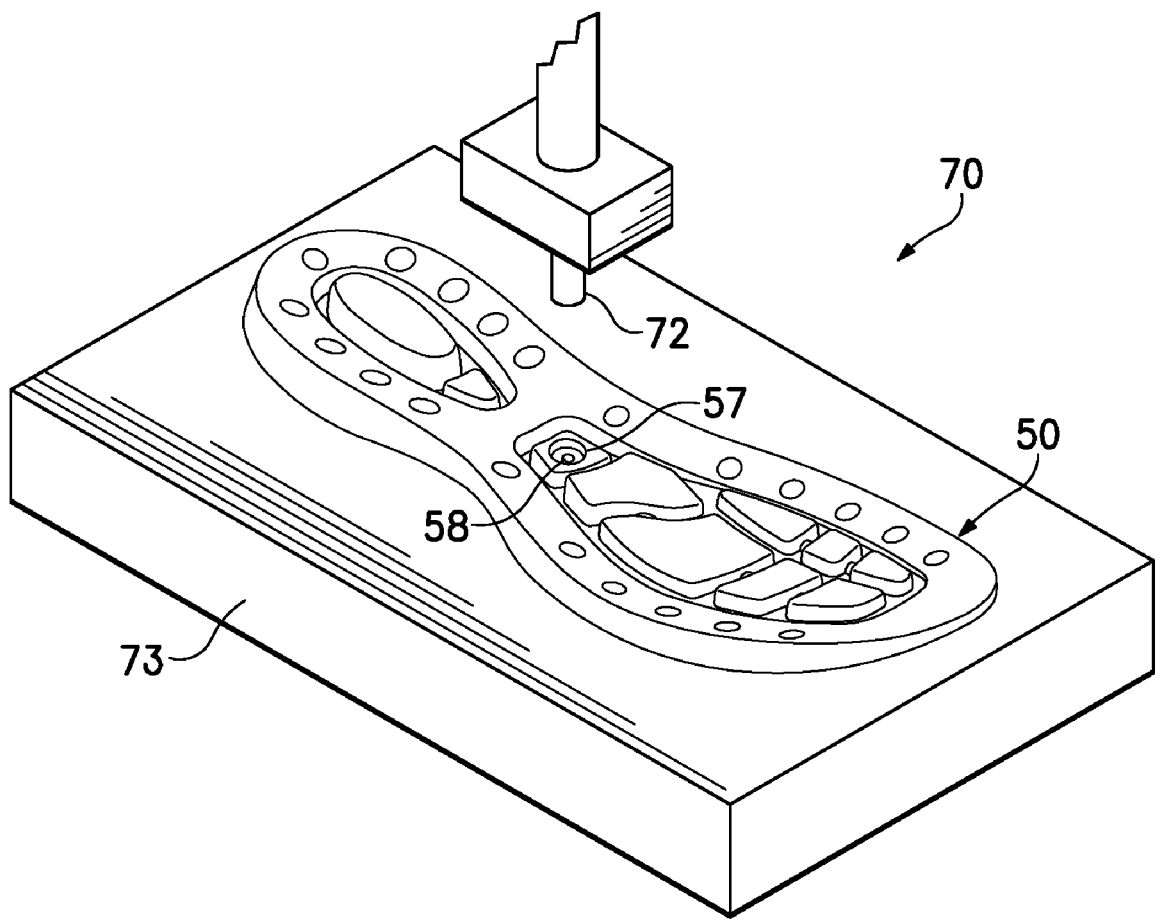
FIGS. 18A and 18B are schematic perspective views of another configuration of the inflation apparatus.
Figure 18B:
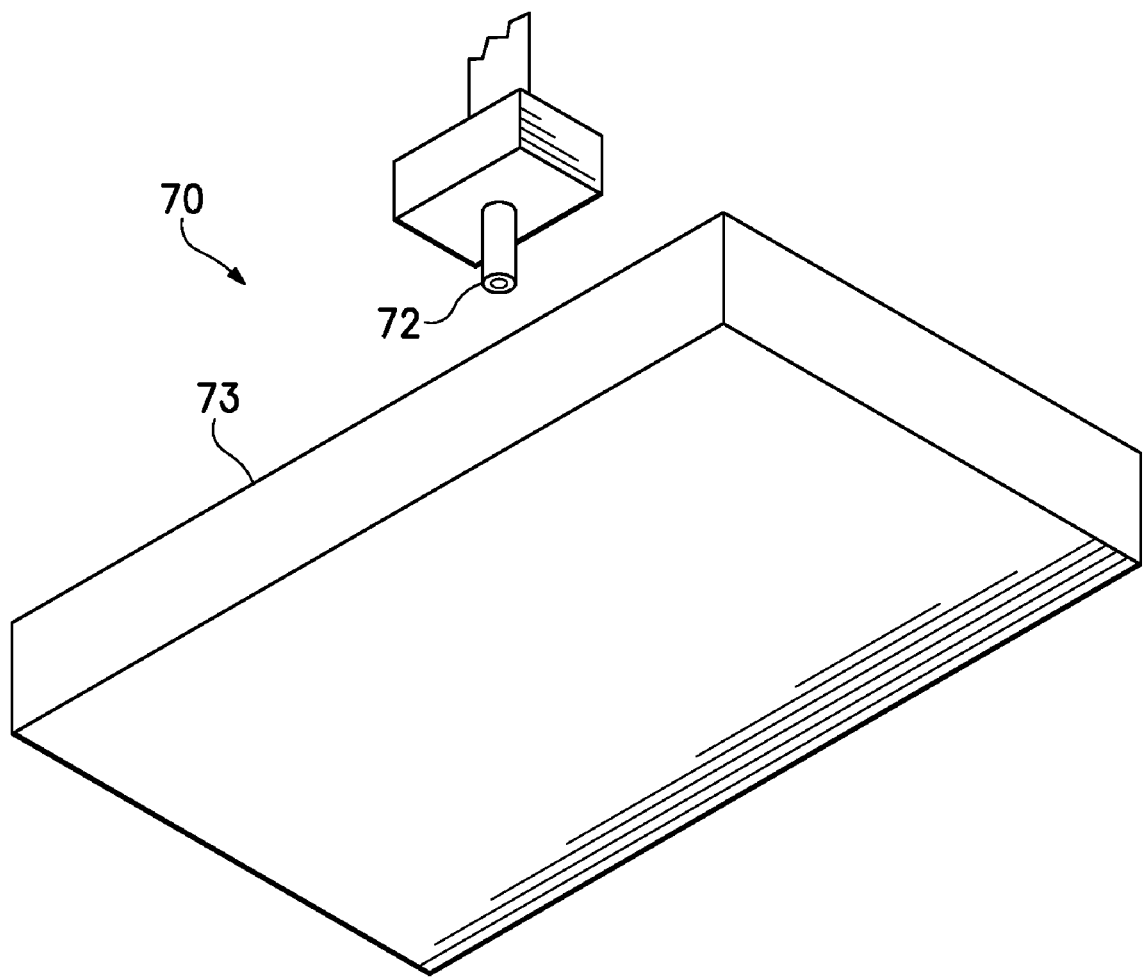

Following the molding process, chamber 50 is pressurized through an inflation process that is similar to the inflation process discussed above. Given that aperture 58 is formed by needle 65, however, punch 71 and the various steps associated with utilizing punch 71 may be removed from the inflation process. Referring to FIGS. 18A and 18B, therefore, inflation apparatus 70 is schematically depicted as including only die 72 and platen 73. Chamber 50, which is already formed to include aperture 58, may be located on platen 73, and die 72 is then utilized to pressurize chamber 50, compresses surfaces 51 and 52 together, and form the bond at inflation area 57 and around aperture 58. Accordingly, the steps of the inflation process that are depicted and discussed relative to FIGS. 14C-14F are utilized.

Additional Chamber Configurations

Figure 19A:
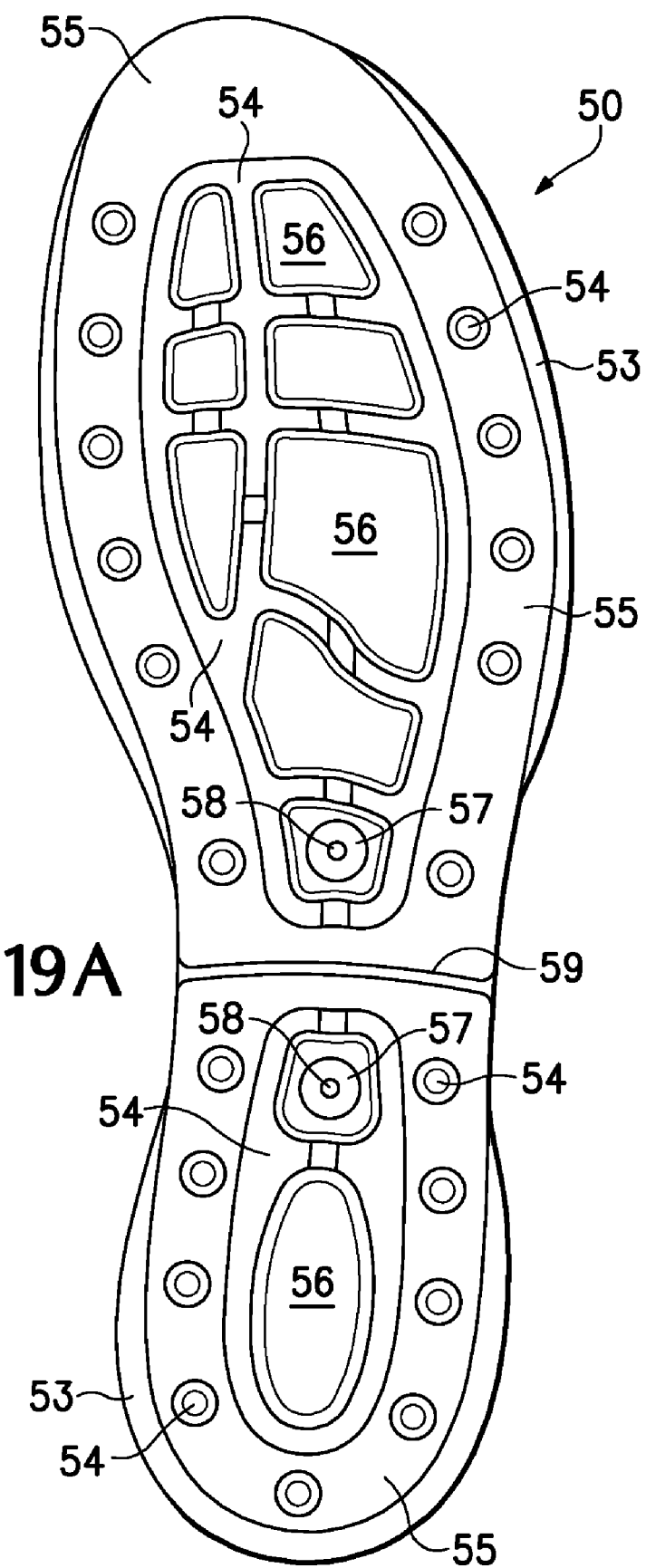
FIGS. 19A-19D are top plan views depicting further configurations of the chamber.
Figure 19B:
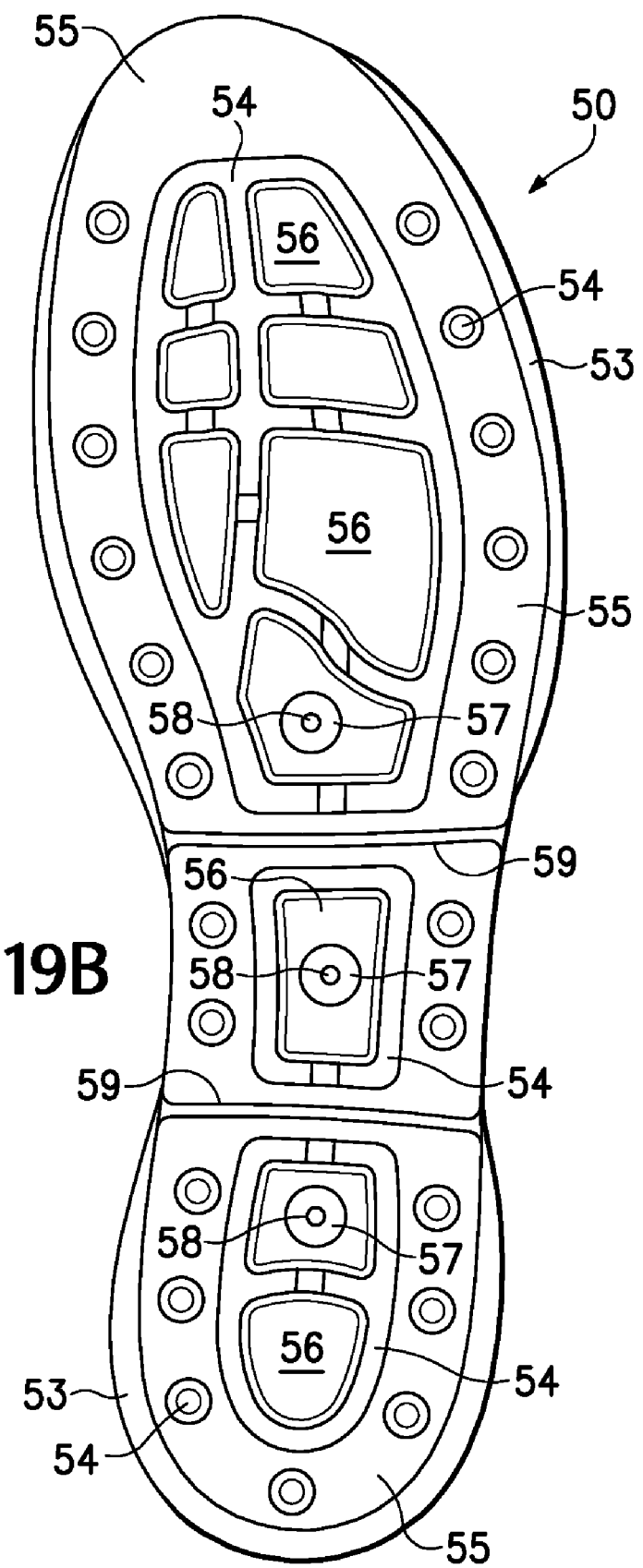
Figure 19C:
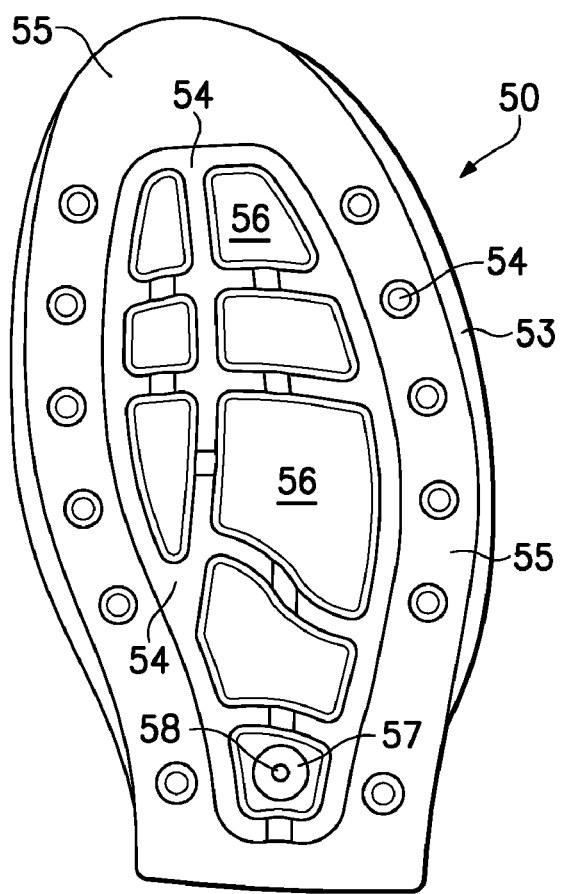
Figure 19D:
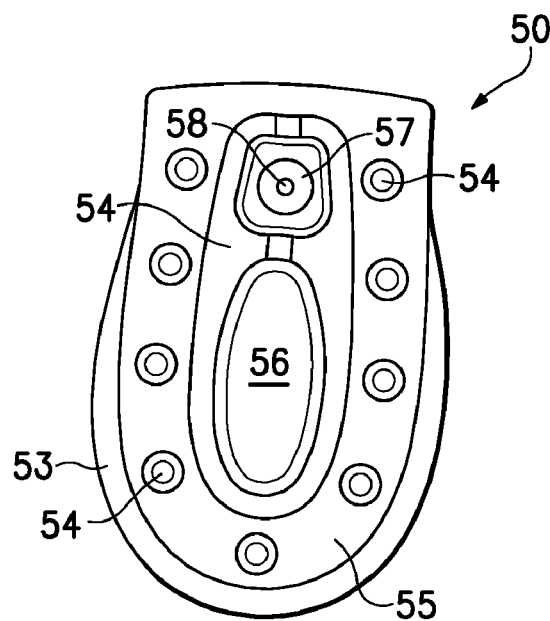

The configuration of chamber 50 depicted above provides an example of a suitable configuration for footwear 10. As another example, chamber 50 may form a bond 59 between regions 13 and 14 to segregate chamber 50 into two subchambers that each include an inflation area 57, as depicted in FIG. 19A. In this configuration, the portion of chamber 50 in regions 11 and 12 may be pressurized less than the portion of chamber 50 in heel region 13. Similarly, chamber 50 may have three inflation areas 57, as depicted in FIG. 19B, that permit different pressurizations for a peripheral area and the two central areas in regions 11 and 13. In some configurations, chamber 50 may be limited to forefoot region 11, as depicted in FIG. 19C, or chamber 50 may be limited to heel region 13, as depicted in FIG. 19D.

Figure 20A:
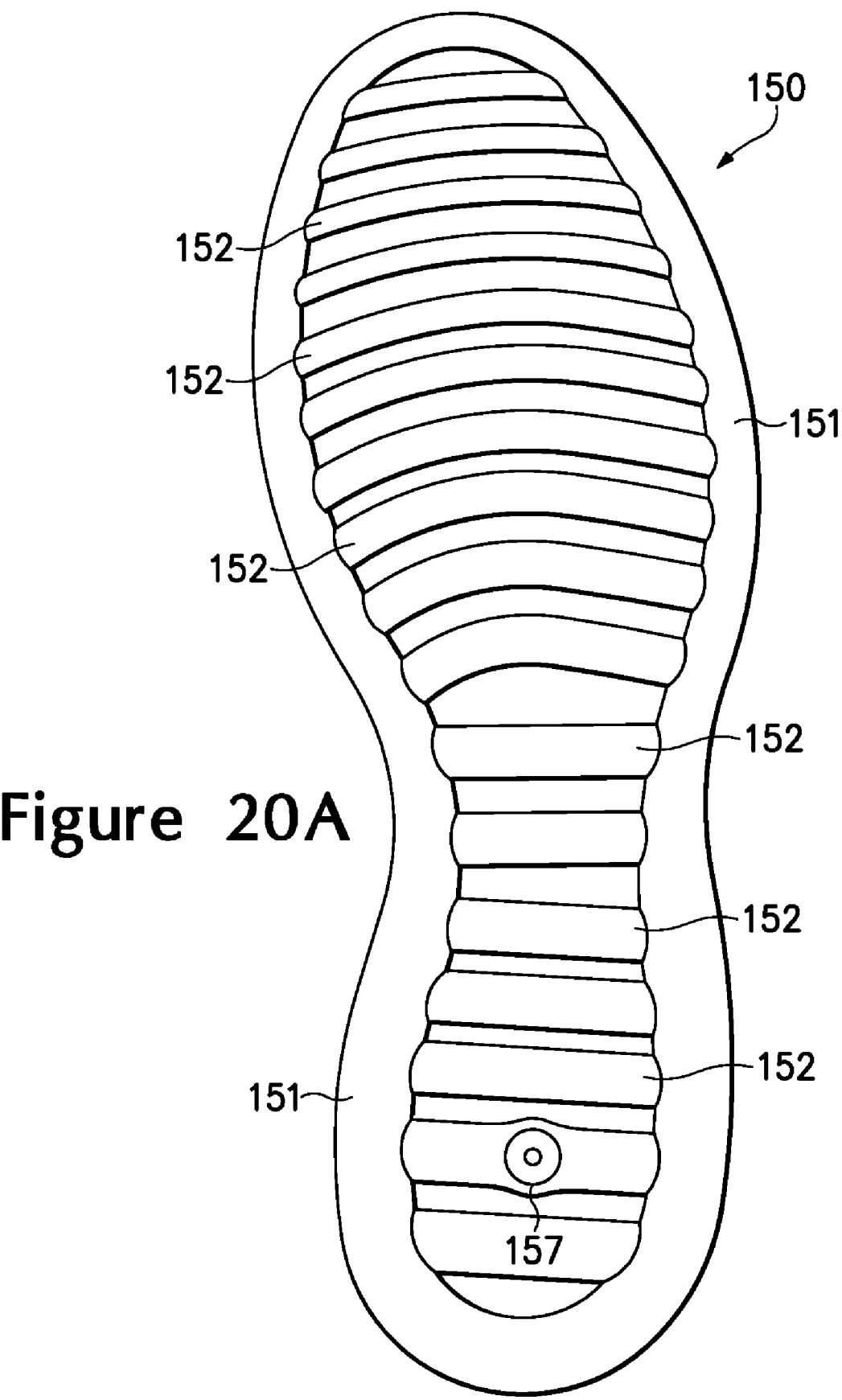
FIGS. 20A-20C are a top plan views of additional chambers.

As an alternative to plate 40 and chamber 50, footwear 10 or other articles of footwear may incorporate a variety of other chambers. Referring to FIG. 20A, a chamber 150 is depicted as being a thermoformed structure that includes a peripheral area 151 extending around a periphery of chamber 150 and a plurality of crossing areas 152 extending laterally across a width of chamber 150. As with chamber 50, peripheral area 151 may be exposed to an exterior of an article of footwear. Accordingly, an inflation area 157 is located in a central portion of chamber 150 (i.e., in one of crossing areas 152) to position inflation area 157 in a portion of chamber 150 that is not visible or only minimally visible from a side of chamber 150.

Figure 20B:
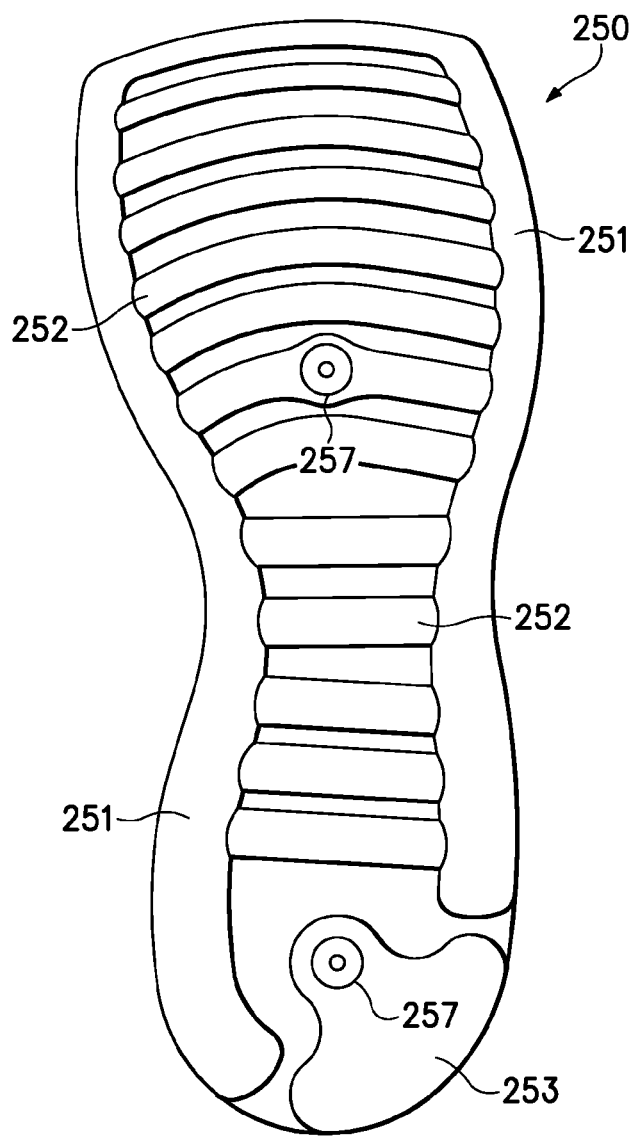

Referring to FIG. 20B, a thermoformed chamber 250 is depicted as having a similar configuration that includes a peripheral area 251 and a plurality of crossing areas 252. In addition, chamber 250 includes a heel area 253. In order to inflate heel area 253 to a different pressure than each of areas 251 and 252, chamber 250 includes two inflation areas 257. One of inflation areas 257 is located in a central portion of chamber 250 (i.e., in one of crossing areas 252) to position inflation area 257 in a portion of chamber 250 that is not visible or only minimally visible from a side of chamber 250. Another of inflation areas 257 is located in heel area 253 to permit heel area 253 to have a different (e.g., lesser) pressure than each of areas 251 and 252. The inflation area 257 located in heel area 253 is also spaced inward from a side of chamber 250 to position inflation area 257 in a portion of chamber 250 that is not visible or only minimally visible from a side of chamber 250.

Figure 20C:
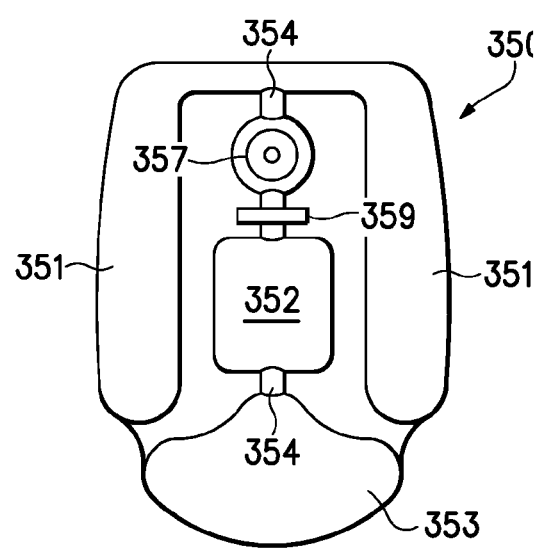

A further configuration of a thermoformed structure is depicted in FIG. 20C as a chamber 350 that includes a peripheral area 351, a central area 352, and a heel area 353. One portion of a conduit 354 extends between peripheral area 351 and central area 352, and another portion of conduit 354 extends between central area 352 and heel area 353. When initially formed, each of areas 351-353 may be in fluid communication through conduit 354. Once pressurized through an inflation area 357, however, a bond 359 is formed that permits peripheral area 351 to be pressurized differently than either of areas 352 and 353. More particularly, inflation apparatus 70 may be utilized at inflation area 357 to pressurize chamber 350 to a first pressure. Once pressurized, bond 359 may be formed to retain the first pressure within areas 352 and 353. Inflation apparatus 70 may then be utilized at inflation area 357 to pressurize peripheral area 351 to a higher second pressure, and then inflation apparatus 70 may bond inflation area 357 to retain the second pressure within peripheral area 351.

Chambers 250 and 350 each include areas with different pressures. In chamber 250, the different pressures are provided through two different inflation areas 257. In chamber 350, however, a single inflation area 357 (and a bond 359) is utilized to impart the different pressures. Accordingly, inflation apparatus 70 (or similar inflation apparatuses) may be utilized in various ways to impart different pressures to areas of a chamber.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing an article of footwear including an upper with a void for receiving a foot of a wearer of the article of footwear and a sole structure having a ground engaging surface, the method comprising:
forming a chamber to include a first surface, an opposite second surface, and a sidewall surface extending between the first surface and the second surface;
defining a depression in the first surface and the second surface, the depression being spaced inward from the sidewall surface, and the depression being located between lateral subchamber portions;
shaping the lateral subchamber portions to extend upwards in a direction towards the upper to a greater extent than the depression and to extend downwards in a direction towards the ground engaging surface to a greater extent than the depression;
defining an aperture in the first surface and in the depression, the aperture being within the depression;
locating a pressurization apparatus adjacent to the first surface and around the aperture;
utilizing the pressurization apparatus to (a) inject a fluid into the chamber through the aperture, (b) compress the first surface against the second surface, and (c) form a bond around the aperture and between the first surface and the second surface; and
incorporating the chamber into a sole structure of the article of footwear.

2. The method recited in claim 1, wherein the step of forming the chamber includes defining a depression in the first surface, and the step of utilizing the pressurization apparatus includes forming the bond at a location corresponding with the depression.

3. The method recited in claim 1, wherein the step of utilizing the pressurization apparatus includes forming the bond with radio frequency energy.

4. A method of manufacturing an article of footwear including an upper with a void for receiving a foot of a wearer of the article of footwear and a sole structure having a ground engaging surface, the method comprising:
forming a chamber to include a first surface, a second surface, and a sidewall surface, the first surface being opposite the second surface, and the sidewall surface extending between the first surface and the second surface;
forming a depression in the first surface and in an area of the first surface that is spaced inward from the sidewall surface;
locating a pressurization apparatus adjacent to the first surface and at a location (a) where the first surface is spaced from the second surface and (b) spaced inward from the sidewall surface;
utilizing the pressurization apparatus to (a) define an aperture through the first surface, (b) inject a fluid into the chamber through the aperture to pressurize an interior of the chamber, (c) compress the first surface against the second surface, and (d) form a bond around the aperture and between the first surface and the second surface; and
incorporating the chamber into the sole structure, wherein one of the first surface and the second surface is oriented to face the upper and another of the first surface and the second surface is oriented to place the ground engaging surface.

5. The method recited in claim 4, wherein the step of utilizing the pressurization apparatus includes forming the bond with radio frequency energy.

6. The method recited in claim 4, further including a step of incorporating the chamber into the sole structure of the article of footwear.

7. A method of manufacturing an article of footwear including an upper with a void for receiving a foot of a wearer of the article of footwear and a sole structure having a ground engaging surface, the method comprising:
forming a chamber to include (a) a first surface and (b) an opposite second surface;
defining a depression in the first surface and the second surface, the depression being spaced inward from a sidewall surface of the chamber, and the depression being located between lateral subchamber portions;
shaping the lateral subchamber portions to extend upwards in a direction towards the upper to a greater extent than the depression and to extend downwards in a direction towards the ground engaging surface to a greater extent than the depression;
defining an aperture in the first and in the depression;
utilizing a pressurization apparatus to (a) inject a fluid into the chamber through the aperture, (b) compress the first surface against the second surface, and (c) form a bond around the aperture and between the first surface and the second surface, and at a location corresponding with the depression; and
incorporating the chamber into a sole structure of the article of footwear, wherein the first surface and the second surface are unbonded to each other and are spaced from each other in a portion of the chamber extending entirely around the bond.

8. The method recited in claim 7, wherein the step of forming the chamber includes defining an interior subchamber which includes the subchamber portions, and defining the depression in the interior subchamber.

9. The method recited in claim 7, wherein the step of utilizing the pressurization apparatus includes forming the bond with radio frequency energy.

10. The method recited in claim 7, wherein the step of forming the chamber includes (a) defining a sidewall surface that extends between the first surface and the second surface and (b) locating the aperture at a position that is spaced from the sidewall surface.

11. A method of manufacturing an article of footwear including an upper with a void for receiving a foot of a wearer of the article of footwear and a sole structure having a ground engaging surface, the method comprising:
forming a chamber including a first surface, an opposite second surface, and a sidewall surface extending between the first surface and the second surface, the sidewall surface having a lateral portion and a medial portion, a portion of the first surface and a portion of the second surface forming an inflation area between the lateral portion of the sidewall and the medial portion of the sidewall, the inflation area being spaced inward from the lateral portion and being spaced inward from the medial portion;

forming a depression in the first surface and in an area of the first surface that is spaced inward from the sidewall surface;

defining an aperture in the first surface in the depression at the inflation area;

utilizing a pressurization apparatus to (a) inject a fluid into the chamber through the aperture, (b) compress the first surface against the second surface in the inflation area, and (c) form a bond between the first surface and the second surface at the inflation area and around the aperture;

incorporating the chamber into a sole structure of the article of footwear, wherein one of the first surface and the second surface is oriented to face the upper and another of the first surface and the second surface is oriented to face the ground engaging surface.

12. The method recited in claim 11, wherein the step of forming the chamber includes forming a subchamber, and the step of defining the aperture includes locating the aperture at the subchamber.

13. The method recited in claim 12, wherein the subchamber is an interior subchamber.

14. The method recited in claim 13, wherein the step of forming the chamber further includes forming a peripheral subchamber, and the interior subchamber is centrally-located in the chamber.

* * * * *